US010523933B2

(12) United States Patent
Wu et al.

(10) Patent No.: US 10,523,933 B2
(45) Date of Patent: Dec. 31, 2019

(54) CONTROL DATA FOR MOTION-CONSTRAINED TILE SET

(71) Applicant: Microsoft Technology Licensing, LLC, Redmond, WA (US)

(72) Inventors: Yongjun Wu, Bellevue, WA (US); Gary J. Sullivan, Bellevue, WA (US); Yifu Zhang, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 162 days.

(21) Appl. No.: 15/649,113

(22) Filed: Jul. 13, 2017

(65) Prior Publication Data
US 2017/0318288 A1 Nov. 2, 2017

Related U.S. Application Data

(63) Continuation of application No. 14/021,883, filed on Sep. 9, 2013, now Pat. No. 9,749,627.
(Continued)

(51) Int. Cl.
*H04B 1/66* (2006.01)
*H04N 19/105* (2014.01)
(Continued)

(52) U.S. Cl.
CPC ......... *H04N 19/105* (2014.11); *H04N 19/167* (2014.11); *H04N 19/174* (2014.11);
(Continued)

(58) Field of Classification Search
CPC ...... H04N 19/176; H04N 19/70; H04N 19/17; H04N 19/55; H04N 19/174; H04N 19/132; H04N 19/61
(Continued)

(56) References Cited

U.S. PATENT DOCUMENTS 5,638,128 A 6/1997 Hoogenboom et al.
6,404,814 B1 6/2002 Apostolopoulos et al.
(Continued)

FOREIGN PATENT DOCUMENTS

CN 1965321 5/2007
CN 102647589 8/2012
(Continued)

OTHER PUBLICATIONS

"Office Action Issued in Russian Patent Application No. 2015142850", dated Aug. 28, 2017, 11 Pages.
(Continued)

*Primary Examiner* — Sath V Perungavoor
*Assistant Examiner* — Peet Dhillon
(74) *Attorney, Agent, or Firm* — Klarquist Sparkman, LLP

(57) ABSTRACT

Control data for a motion-constrained tile set ("MCTS") indicates that inter-picture prediction processes within a specified set of tiles are constrained to reference only regions within the same set of tiles in previous pictures in decoding (or encoding) order. For example, a video encoder encodes multiple pictures partitioned into tiles to produce encoded data. The encoder outputs the encoded data along with control data (e.g., in a supplemental enhancement information message) that indicates that inter-picture prediction dependencies across tile set boundaries are constrained for a given tile set of one or more of the tiles. A video decoder or other tool receives the encoded data and MCTS control data, and processes the encoded data. Signaling and use of MCTS control data can facilitate region-of-interest decoding and display, transcoding to limit encoded data to a selected set of tiles, loss robustness, parallelism in encoding and/or decoding, and other video processing.

20 Claims, 18 Drawing Sheets

Related U.S. Application Data

(60) Provisional application No. 61/809,427, filed on Apr. 8, 2013.

(51) Int. Cl.
*H04N 19/70* (2014.01)
*H04N 19/174* (2014.01)
*H04N 19/167* (2014.01)
*H04N 19/436* (2014.01)
*H04N 19/577* (2014.01)
*H04N 19/107* (2014.01)
*H04N 19/65* (2014.01)
*H04N 19/40* (2014.01)

(52) U.S. Cl.
CPC ......... *H04N 19/436* (2014.11); *H04N 19/577* (2014.11); *H04N 19/70* (2014.11); *H04N 19/107* (2014.11); *H04N 19/40* (2014.11); *H04N 19/65* (2014.11)

(58) Field of Classification Search
USPC ........................................................ 375/240
See application file for complete search history.

(56) References Cited

U.S. PATENT DOCUMENTS

| | | | |
|---|---|---|---|
| 7,630,438 | B2 | 12/2009 | Mukerjee et al. |
| 7,826,531 | B2 | 11/2010 | Wang et al. |
| 8,254,455 | B2 | 8/2012 | Wu et al. |
| 9,584,819 | B2 | 2/2017 | Wang et al. |
| 9,749,627 | B2 | 8/2017 | Wu et al. |
| 2004/0066854 | A1 | 4/2004 | Hannuksela |
| 2010/0232504 | A1* | 9/2010 | Feng ............... H04N 19/176 375/240.13 |
| 2012/0027316 | A1 | 2/2012 | Wang et al. |
| 2012/0183074 | A1 | 7/2012 | Fuldseth |
| 2012/0243614 | A1 | 9/2012 | Hong et al. |
| 2013/0003830 | A1* | 1/2013 | Misra ............... H04N 19/159 375/240.12 |
| 2013/0034171 | A1 | 2/2013 | Winken et al. |
| 2013/0057646 | A1 | 3/2013 | Chen et al. |
| 2013/0101035 | A1* | 4/2013 | Wang ............... H04N 19/70 375/240.12 |
| 2014/0269917 | A1 | 9/2014 | Van der Laan |
| 2015/0010091 | A1 | 1/2015 | Hsu et al. |

FOREIGN PATENT DOCUMENTS

| | | |
|---|---|---|
| JP | 2003-204439 | 7/2003 |
| RU | 2407217 C2 | 12/2010 |

OTHER PUBLICATIONS

"Notice of Allowance Issued in Australian Patent Application No. 2013385808", dated Sep. 11, 2017, 3 Pages.
"Notice of Allowance Issued in U.S. Appl. No. 14/021,883", dated Apr. 12, 2017, 11 Pages.
"Non-Final Office Action Issued in U.S. Appl. No. 14/021,883", dated Nov. 30, 2016, 28 Pages.
Notification of Reasons for Refusal dated Jul. 31, 2018, from Japanese Patent Application No. 2016-507533, 6 pp.
Second Office Action dated Jul. 16, 2018, from Chinese Patent Application No. 201380075400.2, 28 pp.
Bross et al., "High Efficiency Video Coding (HEVC) Text Specification Draft 10 (for FDIS & Last Call)," JCTVC-L1003_v34, 310 pp. (Jan. 2013).
Calagari, "High Efficiency Video Coding (HEVC)," 6 pp., downloaded from World Wide Web (document not dated).
Communication pursuant to Rules 161(1) and 162 EPC dated Nov. 17, 2015, from European Patent Application No. 13774551.9, 2 pp.
Examination Report No. 1 dated Apr. 28, 2017, from Australian Patent Application No. 2013385808, 4 pp.
Flynn et al., "High Efficiency Video Coding (HEVC) Range Extensions Text Specification: Draft 3," JCTVC-M1005, 315 pp. (Apr. 2013).
Hannuksela et al,. "Isolated Regions in Video Coding," *IEEE Trans. On Multimedia*, vol. 6, No. 2, pp. 259-267 (Apr. 2004).
International Search Report and Written Opinion dated Dec. 5, 2013, from International Patent Application No. PCT/US2013/061057, 10 pp.
ITU-T, H.264, "Advanced Video Coding for Generic Audiovisual Services," 680 pp. (Jan. 2012).
Notification of Reasons for Refusal dated Jun. 27, 2017, from Japanese Patent Application No. 2016-507533, 9 pp.
Office Action dated Mar. 16, 2017, from Mexican Patent Application No. MX/a/2015/014202, 6 pp.
Sjoberg et al., "Overview of HEVC High-Level Syntax and Reference Picture Management," IEEE Trans. on Circuits and Systems for Video Technology, vol. 22, No. 12, pp. 1858-1870 (Dec. 2012).
Sullivan et al., "Meeting Report of the 11th Meeting of the Joint Collaborative Team on Video Coding (CT-VC)," JCTVC-K1000, 150 pp. (Oct. 2012).
Sullivan et al., "Overview of the High Efficiency Video Coding (HEVC) Standard," IEEE Trans. on Circuits and Systems for Video Technology, vol. 22, No. 12, pp. 1649-1668 (Dec. 2012).
Wu et al., "Motion-Constrained Tile Sets SEI Message," JCTVC-M0235-v1, 4 pp. (Apr. 8, 2013).
Wu et al., "Motion-Constrained Tile Sets SEI Message," JCTVC-M0235-v2, 5 pp. (Apr. 18, 2013).
Wu et al., "Motion-Constrained Tile Sets SEI Message," JCTVC-M0235-v3, 4 pp. (Apr. 25, 2013).
Yang et al., "2D Compatible Frame Packing Stereo 3D Video," JCTVC-K0116, 5 pp. (Sep. 2012).
Yang et al., "2D Compatible Frame Packing Stereo 3D Video," JCTVC-K0116r1, 3 pp. (Oct. 2012).
Ye et al., "ROI Tile Sections," JCTVC-K0248, 5 pp. (Oct. 2012).
Ye et al., "ROI Tile Sections," JCTVC-K0248r1, 6 pp. (Oct. 2012).
Ye et al., "ROI Tile Sections," JCTVC-K0248r2, 7 pp. (Oct. 2012).
Ye et al., "ROI Tile Sections," JCTVC-K0248 presentation, 10 pp. (Oct. 2012).
Ye et al., "SEI Message: Independently Decodable Regions Based on Tiles," JCTVC-L0049, 6 pp. (Jan. 2013).
Ye et al., "SEI Message: Independently Decodable Regions Based on Tiles," JCTVC-L0049-r1, 8 pp. (Jan. 2013).
Ye et al., "SEI Message: Independently Decodable Regions Based on Tiles," JCTVC-L0049 presentation, 10 pp. (Jan. 2013).
Ye et al., "SEI Message: Independently Decodable Regions Based on Tiles," JCTVC-M0181, 8 pp. (Apr. 9, 2013).
Ye et al., "SEI Message: Independently Decodable Regions Based on Tiles," JCTVC-M0181r1, 8 pp. (Apr. 16, 2013).
Ye et al., "SEI Message: Independently Decodable Regions Based on Tiles," JCTVC-M0181 presentation, 11 pp. (Apr. 16, 2013).
Decision on Grant dated Jan. 15, 2018, from Russian Patent Application No. 2015142850, 9 pp.
First Office Action dated Jan. 25, 2018, from Chinese Patent Application No. 201380075400.2, 26 pp.
ITU-T, H.263, "Video Coding for Low Bit Rate Communication," 226 pp. (Jan. 2005).
Notice of Allowance dated Apr. 3, 2018, from Mexican Patent Application No. MX/a/2015/014202, 2 pp.
Notification of Reasons for Refusal dated Mar. 27, 2018, from Japanese Patent Application No. 2016-507533, 14 pp.
Office Action dated Oct. 6, 2017, from Mexican Patent Application No. MX/a/2015/014202, 5 pp.
Notification of Third Office Action dated Mar. 18, 2019, from Chinese Patent Application No. 201380075400.2, 5 pp.
Examiner's Report dated Aug. 21, 2019, from Canadian Patent Application No. 2,908,007, 4 pp.

\* cited by examiner software 180 implementing one or more innovations for signaling and/or use of control data for motion-constrained tile sets

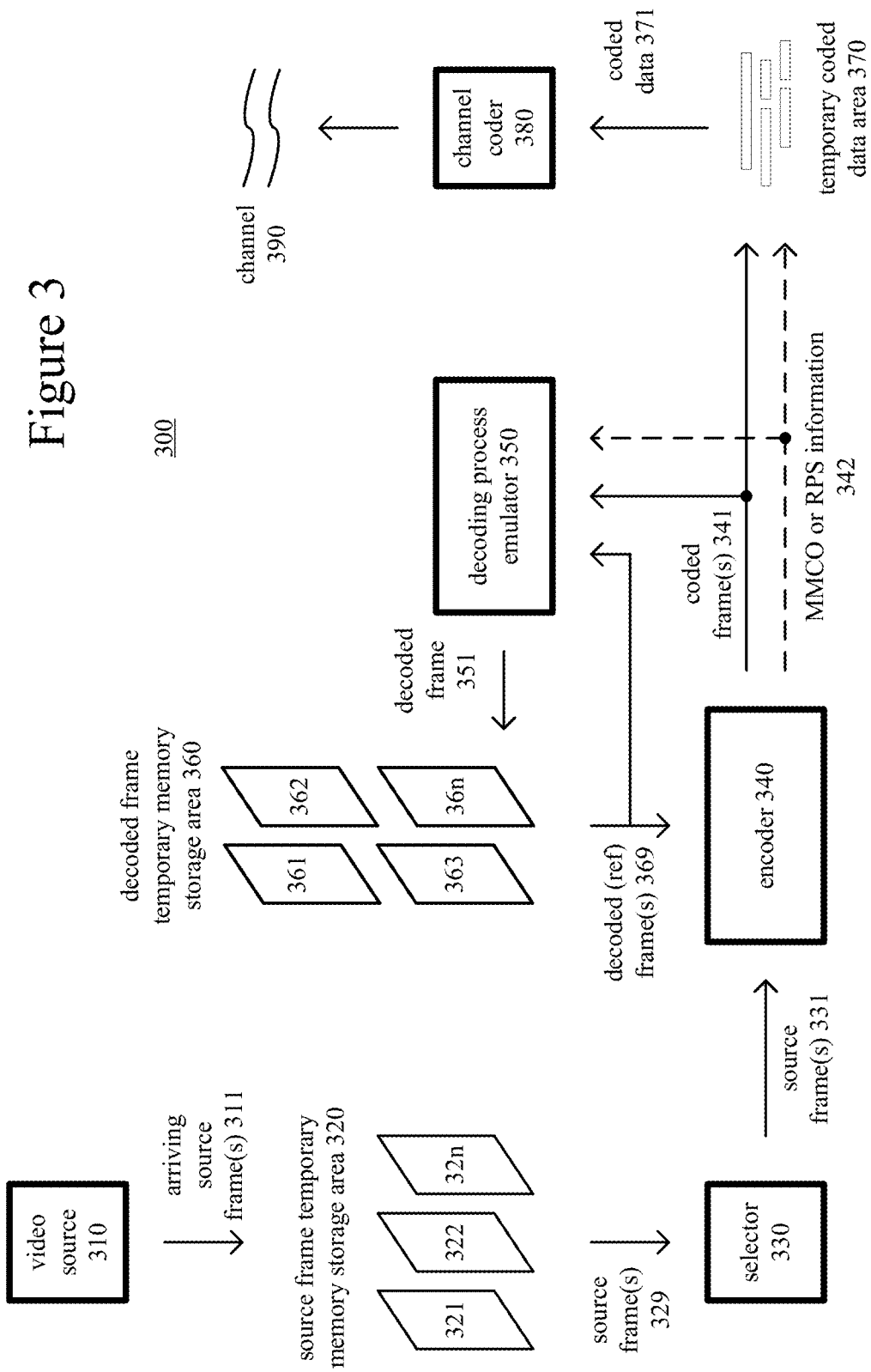

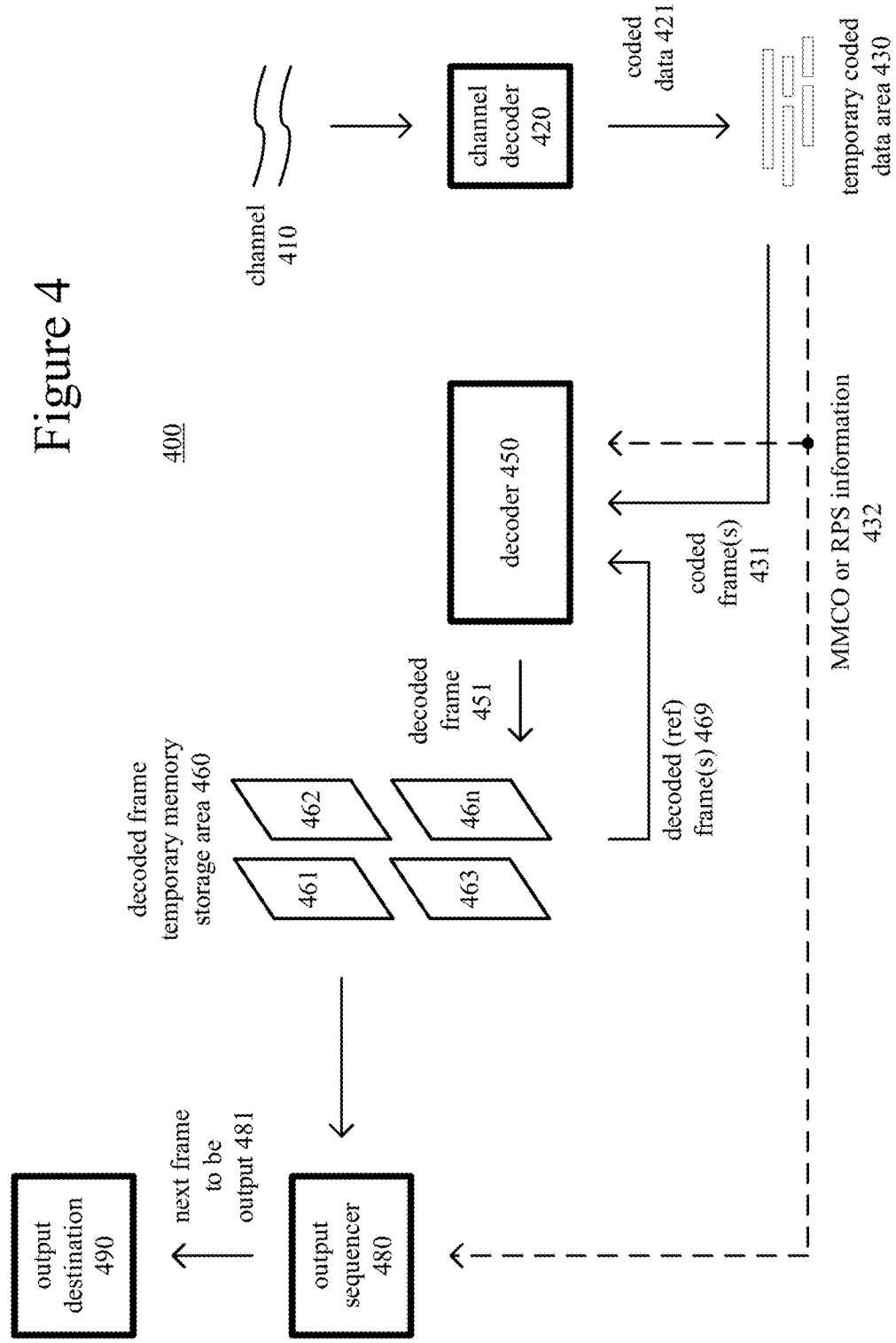

600 frame partitioned
into 16 tiles single tile set A with 4 tiles, and
remaining tiles not in any tile set single tile set A with 6 tiles, and
remaining tiles not in any tile set tile set A with 4 tiles, and tile
set B with surrounding 12 tiles tile set A with 8 tiles, and tile set B
with 4 tiles adjoining each side of A tile sets A, B, C and D,
each with four tiles

Figure 7g
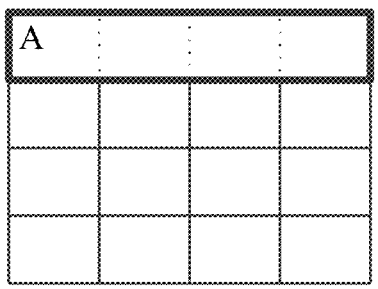
tile set A with four tiles
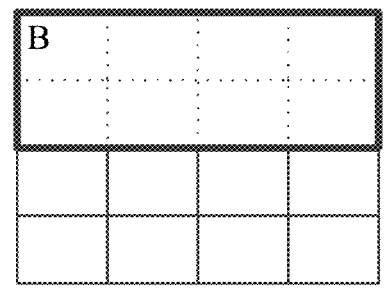
tile set B that overlaps tile set A
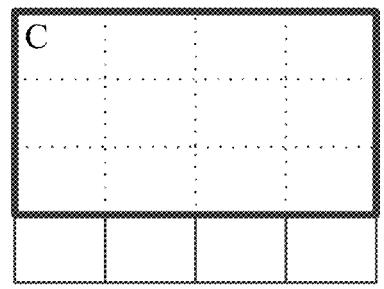
tile set C that overlaps tile set A and tile set B

Figure 8
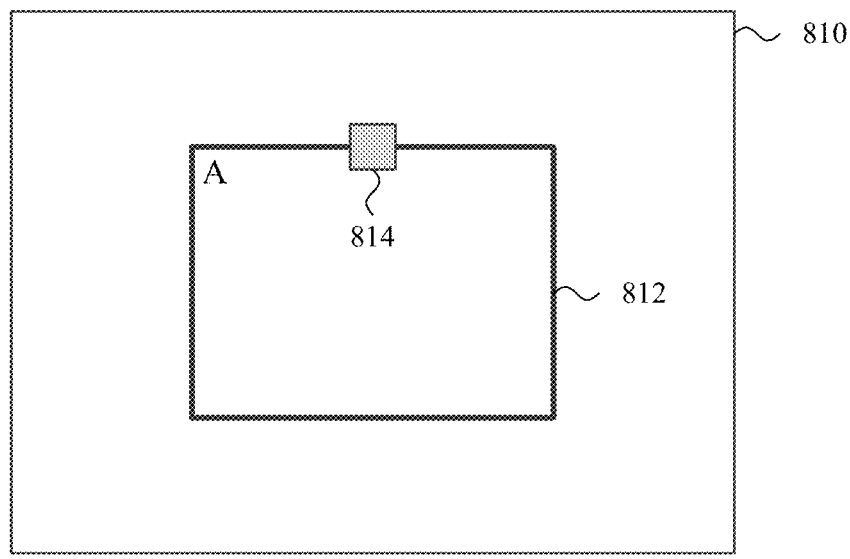
region (814) in reference frame (810),
without motion constraints for tile set A (812)
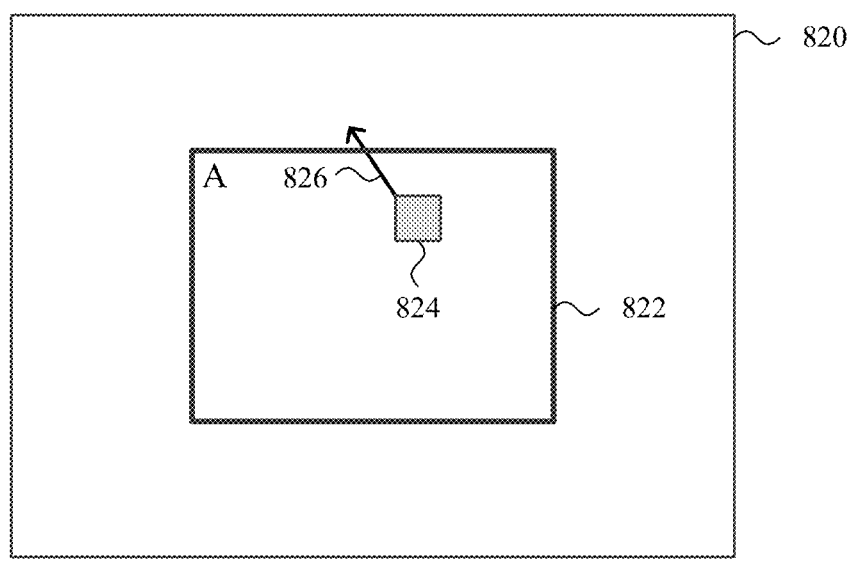
motion vector (826) for prediction unit (824) of
tile set A(822) in current frame (820)

Figure 9
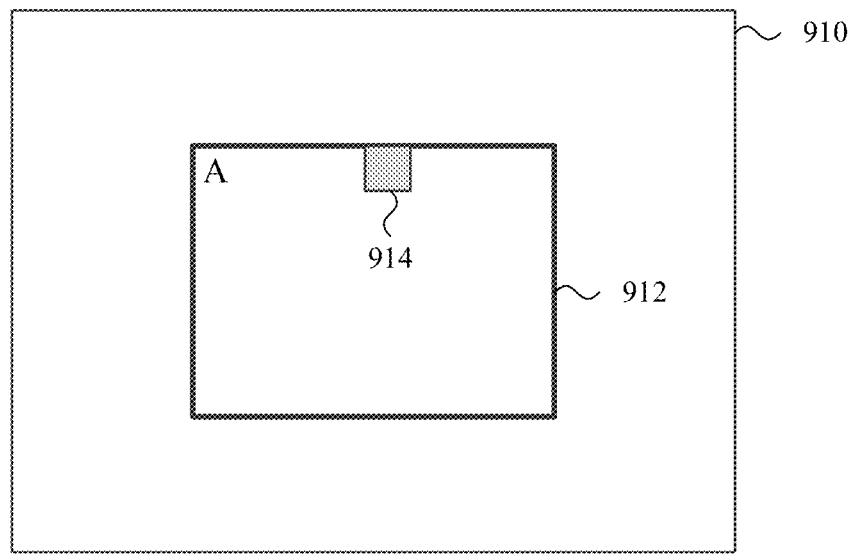
region (914) in reference frame (910),
with motion constraints for tile set A (912)
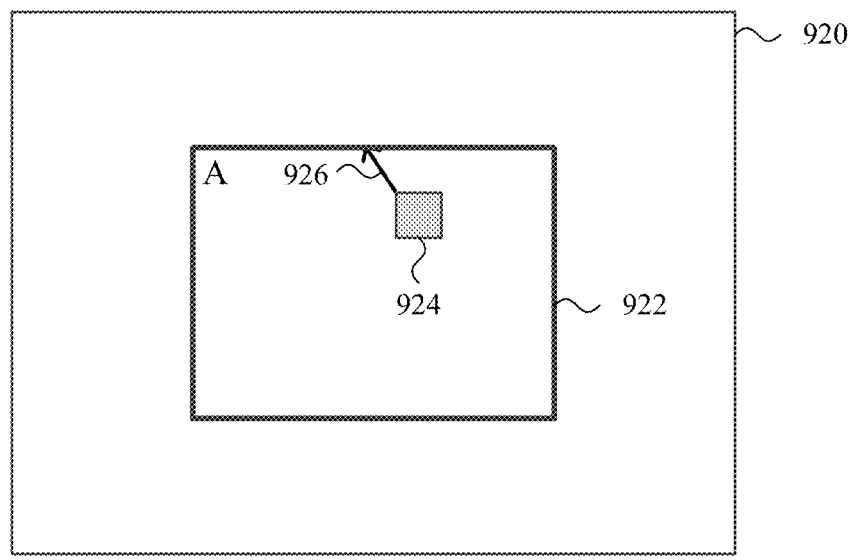
motion vector (926) for prediction unit (924) of
tile set A(922) in current frame (920)

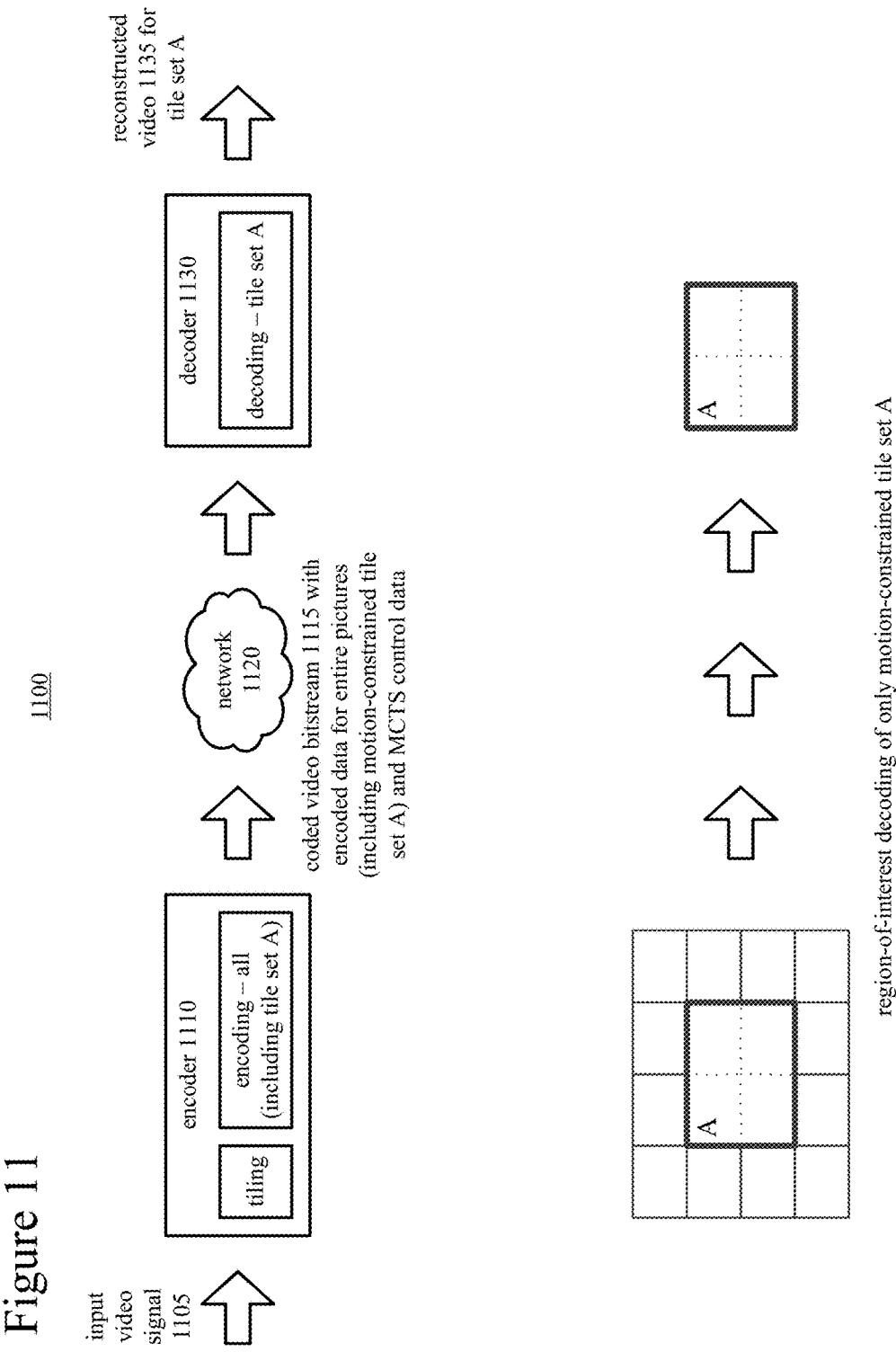

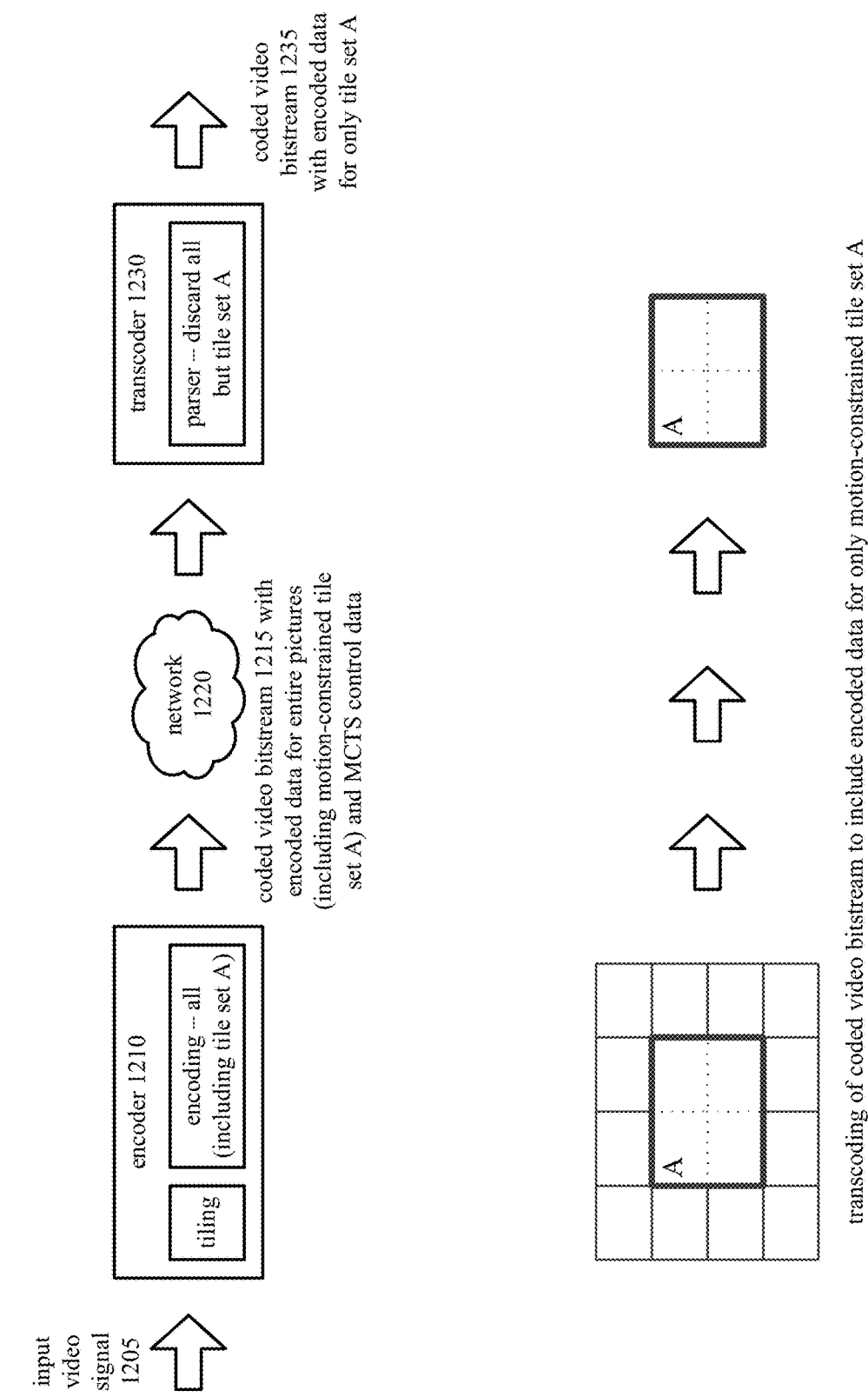

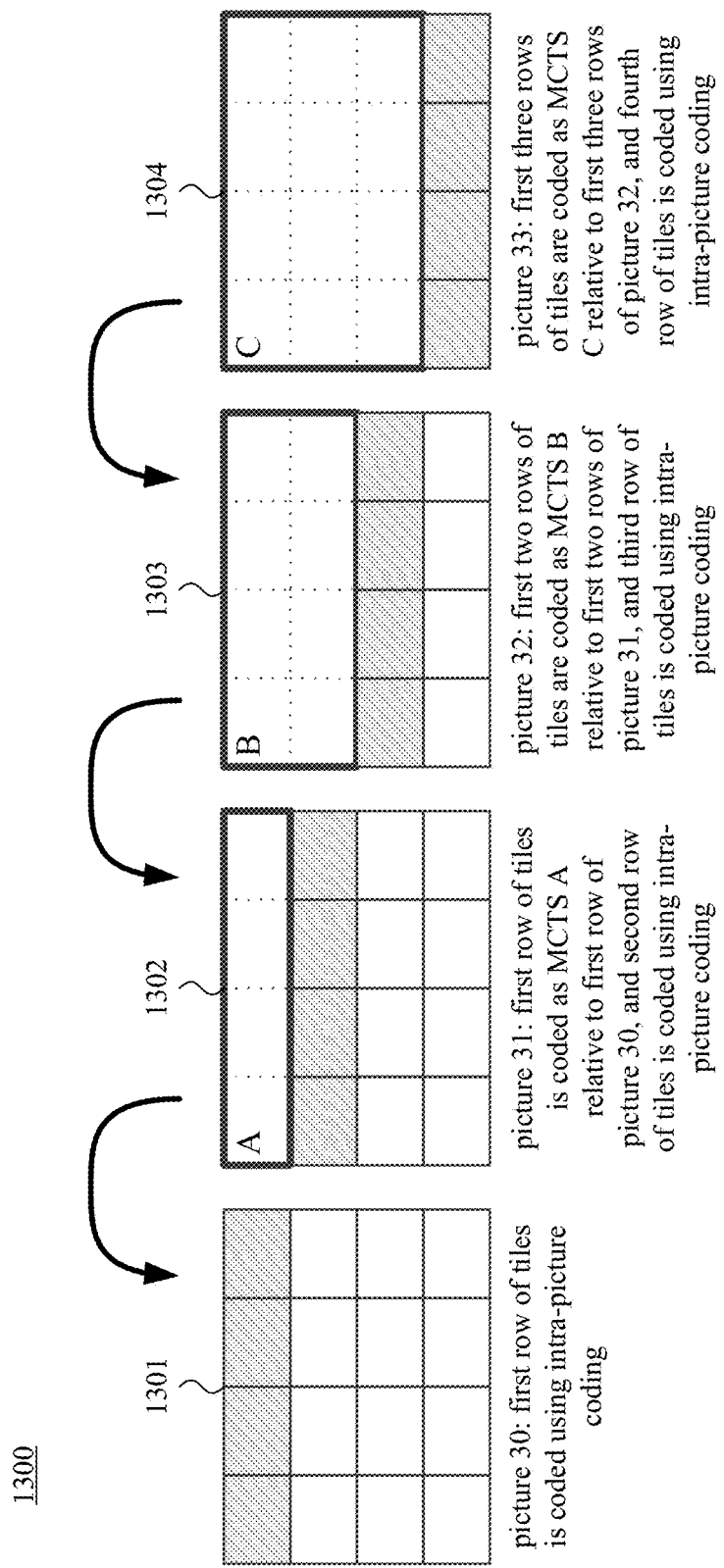

Figure 14a          1401

| motion_constrained_tile_set( payloadSize ) { | Descriptor |
|---|---|
|   num_tile_rects_in_set_minus1 | ue(v) |
|   for( i = 0; i <= num_tile_rects_in_set_minus1; i++) { | |
|     left_tile_column[ i ] | ue(v) |
|     top_tile_row[ i ] | ue(v) |
|     width_in_tile_columns_minus1[ i ] | ue(v) |
|     height_in_tile_rows_minus1[ i ] | ue(v) |
|   } | |
|   exact_sample_value_match_flag | u(1) |
|   pan_scan_rect_flag | u(1) |
|   if( pan_scan_rect_flag ) | |
|     mcts_psr_id | ue(v) |
| } | |

Figure 14b          1402

| motion_constrained_tile_group_set( payloadSize ) { | Descriptor |
|---|---|
|   num_tile_groups_in_set_minus1 | ue(v) |
|   for( i = 0; i <= num_tile_groups_in_set_minus1; i++) { | |
|     top_left[ i ] | ue(v) |
|     bottom_right[ i ] | ue(v) |
|   } | |
|   pan_scan_rect_flag | u(1) |
|   if( pan_scan_rect_flag ) | |
|     pan_scan_rect_id | ue(v) |
| } | |

Figure 14c            1403

| motion_constrained_tile_set( payloadSize ) { | Descriptor |
|---|---|
| num_sets_in_message_minus1 | ue(v) |
| for( i = 0; i <= num_sets_in_message_minus1; i++) { | |
|     mcts_id[ i ] | ue(v) |
|     num_tile_rects_in_set_minus1[ i ] | ue(v) |
|     for( j = 0; j <= num_tile_rects_in_set_minus1[ i ]; j++) { | |
|         left_tile_column[ i ][ j ] | ue(v) |
|         top_tile_row[ i ][ j ] | ue(v) |
|         width_in_tile_columns_minus1[ i ][ j ] | ue(v) |
|         height_in_tile_rows_minus1[ i ][ j ] | ue(v) |
|     } | |
|     exact_sample_value_match_flag[ i ] | u(1) |
|     pan_scan_rect_flag[ i ] | u(1) |
|     if( pan_scan_rect_flag[ i ] ) | |
|         mcts_psr_id[ i ] | ue(v) |
|     } | |
| } | |

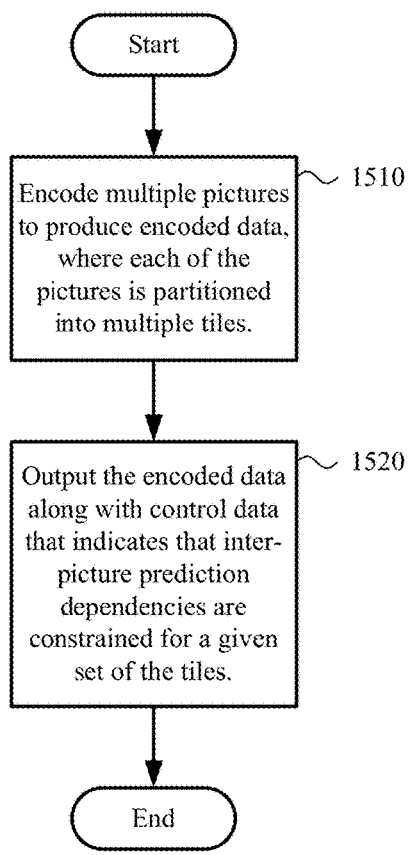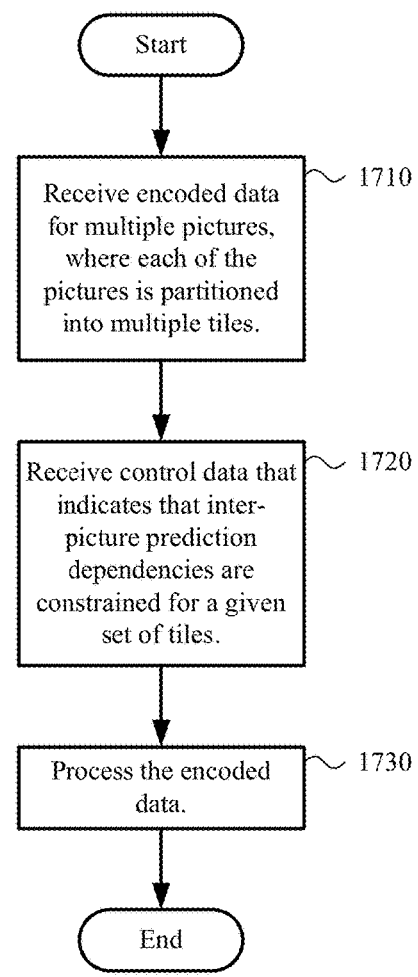

CONTROL DATA FOR MOTION-CONSTRAINED TILE SET

CROSS REFERENCE TO RELATED APPLICATION

This application is a continuation of U.S. patent application Ser. No. 14/021,883, filed Sep. 9, 2013, which claims the benefit of U.S. Provisional Patent Application No. 61/809,427, filed Apr. 8, 2013, the disclosures of which are hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In the January 2013 version of the HEVC standard (see Bross et al., "High Efficiency Video Coding (HEVC) Text Specification Draft 8", JCTVC-L1003_v34, January 2013), a picture can be partitioned into multiple tiles, which are rectangular regions. When the syntax element tiles_enabled_flag is equal to 1, a picture is constructed of tiles. Tiles define horizontal and vertical boundaries within a picture and are organized within the picture according to tile columns and tile rows. When tiles are used, HEVC bitstream syntax and HEVC decoding processes are structured to eliminate intra-picture prediction dependencies across tile boundaries within the same picture, and to eliminate entropy decoding dependencies across tile boundaries within the same picture. Inter-picture prediction dependencies are not constrained, however, with respect to tile boundaries according to the January 2013 version of the HEVC standard.

SUMMARY

In summary, the detailed description presents innovations in the signaling and use of control data for a motion-constrained tile set ("MCTS"). For example, the innovations support signaling and use of control data to indicate that inter-picture prediction processes within one or more specified sets of tiles are constrained to reference only regions within each corresponding set of tiles in other pictures. This can facilitate region-of-interest encoding, decoding and display, transcoding to limit encoded data to a selected set of tiles, loss robustness, and parallelism in encoding and/or decoding.

According to one aspect of the innovations described herein, a video encoder or other tool encodes multiple pictures to produce encoded data, where each of the pictures is partitioned into multiple tiles. For example, the tool decides whether inter-picture prediction dependencies across specific boundaries are to be constrained for a set of tiles and, if so, constrains motion estimation during the encoding such that inter-picture prediction dependencies across the specific boundaries are avoided for the tile set. In some implementations, the specific boundaries are the boundaries of the same tile set from picture-to-picture, but in other implementations the specific boundaries can be boundaries of another tile set or other region or regions used for inter-picture prediction. The tool outputs the encoded data along with control data that indicates that inter-picture prediction dependencies across specific boundaries are constrained for a given tile set of one or more tiles of the multiple tiles. Constraining inter-picture prediction dependencies for multiple sets of tiles can facilitate use of parallel processing in encoding and can also help provide region-of-interest decoding functionality or gradual decoder refresh functionality.

According to another aspect of the innovations described herein, a video decoder or other tool receives encoded data for multiple pictures, where each of the multiple pictures is partitioned into multiple tiles. The tool also receives control data that indicates that inter-picture prediction dependencies across specific boundaries are constrained for a given tile set of one or more tiles of the multiple tiles. The tool then processes the encoded data, for example, decoding the given tile set as a region-of-interest within the pictures without decoding portions of the pictures outside of the given tile set. Or, as part of the processing of the encoded data, the tool transcodes the encoded data, removing encoded data for portions of the pictures outside of the given tile set, and organizing encoded data for the given tile set as a new bitstream. Or, as part of the processing of the encoded data, upon detection of loss of at least some of the encoded data other than the given tile set, the decoder decodes the given tile set as part of loss recovery. Also, constraining inter-picture prediction dependencies for multiple sets of tiles can facilitate use of parallel processing in decoding.

In example implementations, a given tile set is parameterized in the control data as one or more tile rectangles including the one or more tiles of the tile set. For example, for a given tile rectangle in the tile set, the control data includes syntax elements that identify two corners of the tile rectangle (such as a top-left corner of the tile rectangle and bottom-right corner of the tile rectangle). The control data can also include an identifier of the tile set, a count parameter that indicates a count of tile rectangles in the tile set and, for each of the tile rectangles in the tile set, syntax elements that indicate location of the tile rectangle.

In example implementations, the multiple pictures are identically partitioned to produce tiles within each of the pictures. Typically, a given tile set is identical for each of the pictures. In some cases, however, tile sets can differ between at least some of the pictures. Alternatively, different pictures can be partitioned into tiles in different ways.

In example implementations, the control data is a supplemental enhancement information ("SEI") message that indicates that inter-picture prediction dependencies across tile set boundaries are constrained for a tile set. One SEI message addresses inter-picture prediction dependencies for a single tile set, and different SEI messages can address different tile sets. Alternatively, a single SEI message addresses inter-picture prediction dependencies for each of multiple tile sets. Or, instead of SEI messages, the control data can be a flag whose value indicates whether inter-picture prediction dependencies across tile set boundaries are constrained for a tile set. Or, the control data can take some other form.

The signaling and use of MCTS control data can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIGS. 7a-7g are diagrams illustrating examples of frames partitioned into tiles, which may be organized into tile sets.

FIG. 8 is a diagram illustrating motion estimation and motion-compensated prediction for a prediction unit of a tile set without motion constraints at tile set boundaries.

FIG. 9 is a diagram illustrating motion estimation and motion-compensated prediction for a prediction unit of a tile set with motion constraints at tile set boundaries.

FIG. 11 is a diagram illustrating an example of region-of-interest decoding for pictures with an MCTS.

FIG. 12 is a diagram illustrating an example of transcoding for pictures with an MCTS.

FIG. 13 is a diagram illustrating an example of gradual decoder refresh functionality for pictures with MCTSs.

FIGS. 14a-14c are tables illustrating syntax of SEI messages for an MCTS in example implementations.

FIG. 15 is a flowchart illustrating a generalized technique for signaling MCTS control data.

FIG. 17 is a flowchart illustrating a generalized technique for processing encoded data signaled along with MCTS control data.

DETAILED DESCRIPTION

The detailed description presents approaches to signaling and/or use of control data for a motion-constrained tile set ("MCTS"). In particular, the detailed description presents innovations for signaling and use of control data that indicates that inter-picture prediction processes within a specified set of tiles are constrained to reference only regions within the same set of tiles in other pictures. In various examples, syntax and semantics of a supplemental enhancement information ("SEI") message for MCTS control data are presented. MCTS control data can facilitate complexity scalability for region-of-interest decoding and display, transcoding to limit encoded data to a selected set of tiles, loss robustness, and parallel encoding and/or decoding.

Although operations described herein are in places described as being performed by an encoder (e.g., video encoder), decoder (e.g., video decoder) or transcoding tool (e.g., video transcoder), in many cases the operations can alternatively be performed by another type of media processing tool (e.g., video processor for up-sampling, video processor for down-sampling).

Some of the innovations described herein are illustrated with reference to syntax elements and operations specific to the HEVC standard. For example, reference is made to the draft version JCTVC-L1003 of the HEVC standard—"High Efficiency Video Coding (HEVC) Text Specification Draft 8", JCTVC-L1003_v34, January 2013, the disclosure of which is hereby incorporated by reference. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
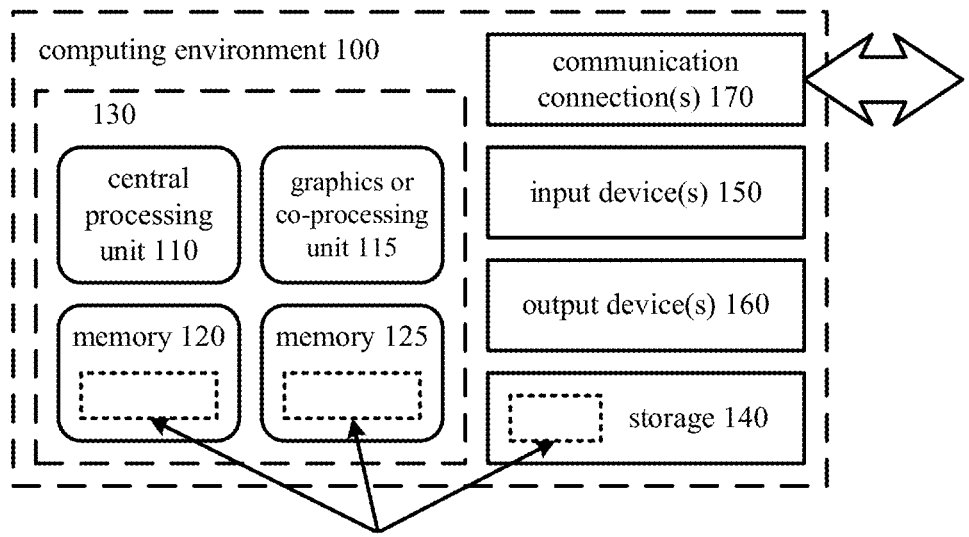
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for signaling and/or use of MCTS control data, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for signaling and/or use of MCTS control data.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
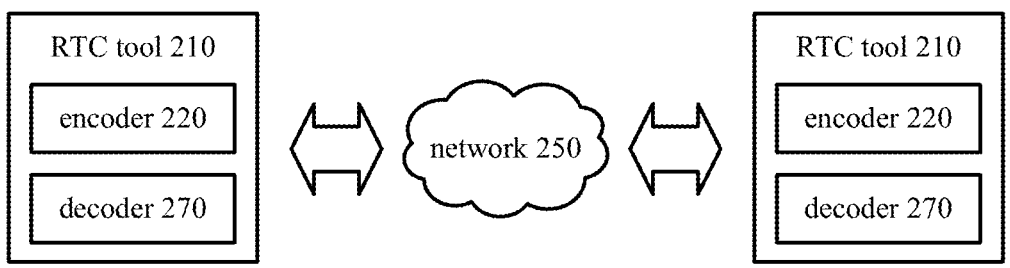
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include MCTS control data (e.g., SEI messages for MCTSs).

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding.

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, motion estimation and compensation, frequency transforms, quantization and entropy coding. The exact operations performed by the encoder (340) can vary depending on compression format. The format of the output encoded data can be HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. The encoder (340) can then group the tiles into one or more tile sets, where a tile set is a group of one or more of the tiles. The tile(s) in a tile set can be contiguous in a frame. Or, a tile set can include tiles that are not contiguous in the frame. Typically, the tile set(s) defined for a frame are the same tile set(s) as defined for other frames in a series of frames (e.g., for a group of frames, for an entire sequence).

The encoder (340) represents an inter-coded, predicted frame in terms of prediction from reference frames. A motion estimator estimates motion of blocks or other sets of samples of a source frame (331) with respect to one or more reference frames (369). When multiple reference frames are used, the multiple reference frames can be from different temporal directions or the same temporal direction. As part of the motion estimation, the encoder (340) can constrain motion vectors for blocks within a tile set of a current frame so that the motion-compensated prediction reference regions fall within the same tile set in the reference frame(s). A motion-compensated prediction reference region is a region of samples in the reference frame(s) that are used to generate motion-compensated prediction values for a prediction unit (e.g., block) of samples of a current frame. Motion-compensated prediction may involve processes such as fractional-position interpolation which apply filtering to samples of somewhat-larger regions in the reference frame(s), compared to the size of the prediction unit. In other words, the motion-compensated prediction reference region used to compute motion-compensated prediction values for a prediction unit of a current frame can have a size larger than the prediction unit, due to use of interpolation filters whose support extends beyond the borders of the nominal prediction unit size. Using such an MCTS can facilitate functionality for region-of-interest decoding for the tile set, transcoding and parallel decoding. The motion estimator outputs motion information such as motion vector information, which is entropy coded. A motion compensator applies motion vectors to reference frames (369) to determine motion-compensated prediction values.

The encoder determines the differences (if any) between a block's motion-compensated prediction values and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. Similarly, for intra prediction, the encoder (340) can determine intra-prediction values for a block, determine prediction residual values, and encode the prediction residual values (with a frequency transform, quantization and entropy encoding). In particular, the entropy coder of the encoder (340) compresses quantized transform coefficient values as well as certain side information (e.g., motion vector information, QP values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more SEI messages or video usability information ("VUI") messages). Such media metadata can include syntax elements that indicate MCTS control data (e.g., SEI messages for MCTSs).

The aggregated data (371) from the temporary coded data area (370) are processed by a channel encoder (380). The channel encoder (380) can packetize the aggregated data for transmission as a media stream (e.g., according to a media container format such as ISO/IEC 14496-12), in which case the channel encoder (380) can add syntax elements as part of the syntax of the media transmission stream. Such syntax can include syntax elements that indicate MCTS control data. Or, the channel encoder (380) can organize the aggregated data for storage as a file (e.g., according to a media container format such as ISO/IEC 14496-12), in which case the channel encoder (380) can add syntax elements as part of the syntax of the media storage file. Such syntax can include syntax elements that indicate MCTS control data. Or, more generally, the channel encoder (380) can implement one or more media system multiplexing protocols or transport protocols, in which case the channel encoder (380) can add syntax elements as part of the syntax of the protocol(s). Again, such syntax can include syntax elements that indicate MCTS control data. The channel encoder (380) provides output to a channel (390), which represents storage, a communications connection, or another channel for the output.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include syntax elements that indicate MCTS control data.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media container format such as ISO/IEC 14496-12), in which case the channel decoder (420) can parse syntax elements added as part of the syntax of the media transmission stream. Such syntax can include syntax elements that indicate MCTS control data. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Such syntax can include syntax elements that indicate MCTS control data. Or, more generally, the channel decoder (420) can implement one or more media system demultiplexing protocols or transport protocols, in which case the channel decoder (420) can parse syntax elements added as part of the syntax of the protocol(s). Again, such syntax can include syntax elements that indicate MCTS control data.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages). Such media metadata can include syntax elements that indicate MCTS control data (e.g., as part of SEI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated predictions of sub-blocks and/or blocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive de-blocking filter to smooth discontinuities across block boundary rows and/or columns in the decoded frame (451).

The decoder (450) can use MCTS control data in various ways, depending on implementation. For example, the decoder (450) can use MCTS control data when deciding to decode different tile sets in parallel. Or, the decoder (450) can use MCTS control data when deciding to decode only a selected tile set for display as a region of interest, without decoding portions of the frames outside of the tile set.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
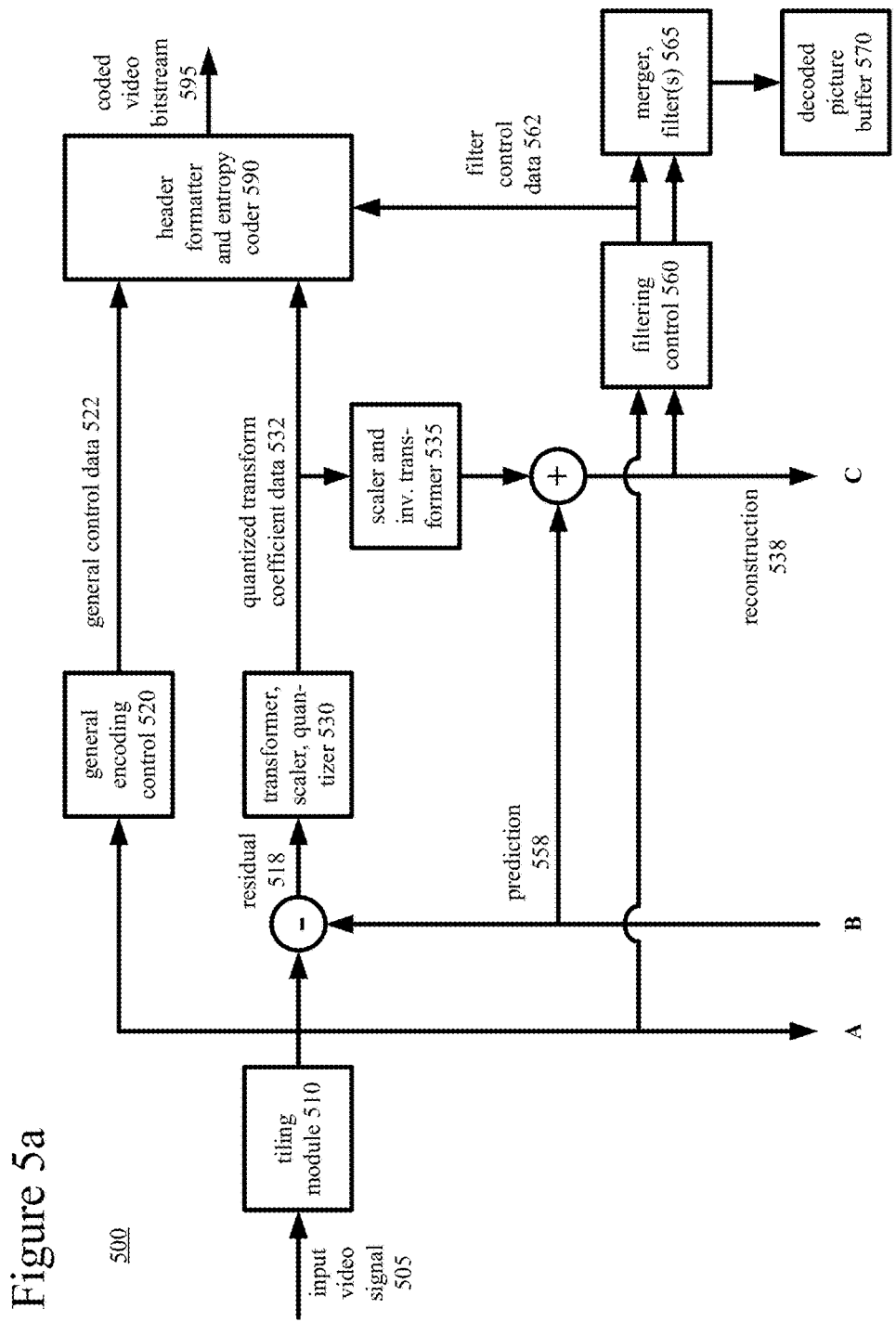
FIGS. 5a and 5b are diagrams illustrating an example video encoder in conjunction with which some described embodiments can be implemented.
Figure 5B:
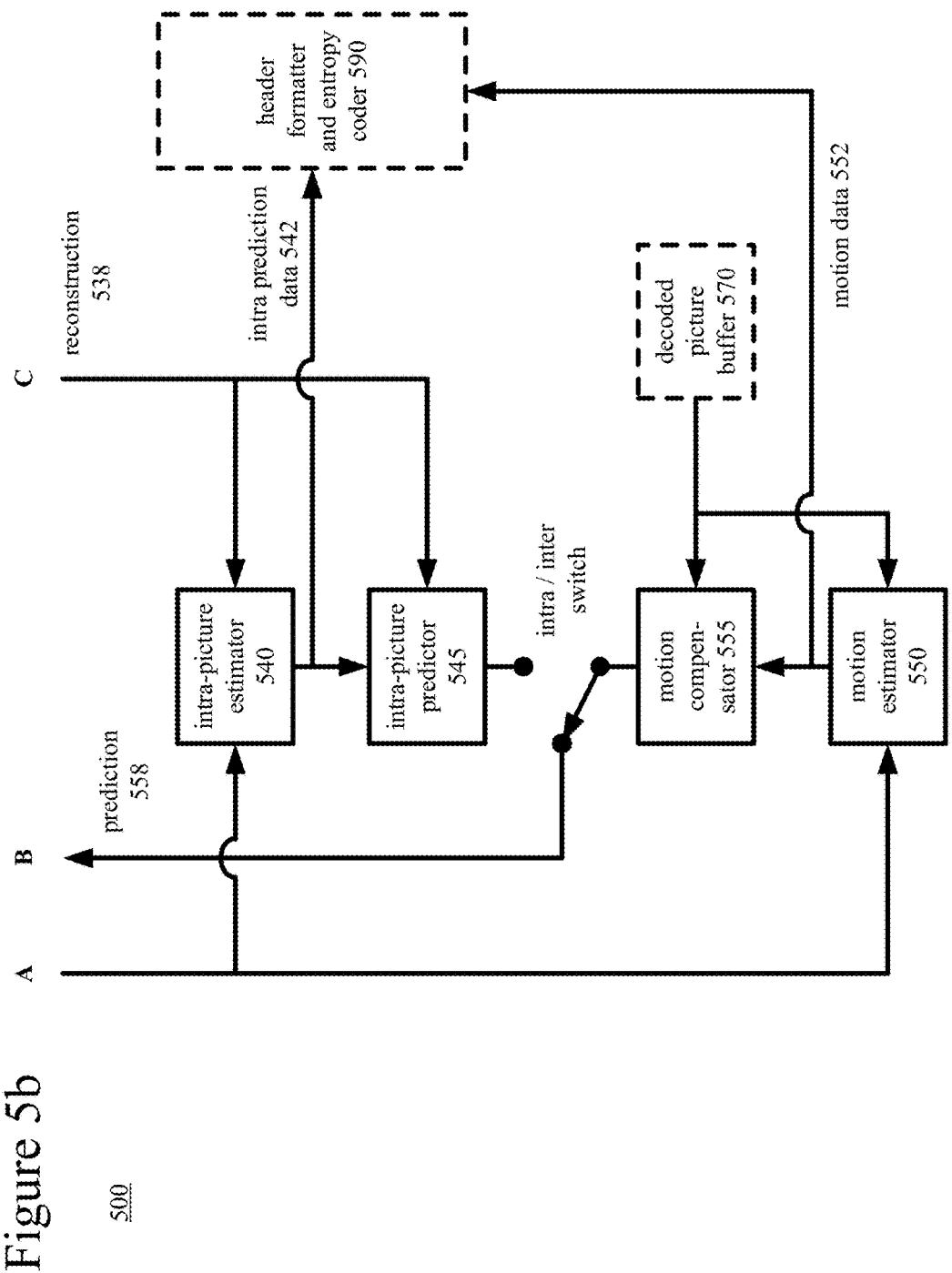

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the frequency transform and entropy encoding stages. For example, a picture can be divided into 64×64 blocks, 32×32 blocks or 16×16 blocks, which can in turn be divided into smaller blocks and sub-blocks of pixel values for coding and decoding.

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. The tiling module (510) can then group the tiles into one or more tile sets, where a tile set is a group of one or more of the tiles. The tile(s) in a tile set can be contiguous in a picture. Or, a tile set can include tiles that are not contiguous in the picture. Typically, the tile set(s) defined for a picture are the same tile set(s) as defined for other pictures in a series of pictures (e.g., for a group of pictures, for an entire sequence).

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590). The general encoding control (520) can decide whether to use MCTSs during encoding.

If the current picture is predicted using inter-picture prediction, a motion estimator (550) estimates motion of blocks, sub-blocks or other sets of pixel values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction.

For an MCTS of a current picture, as part of the motion estimation, the motion estimator (550) can constrain motion vectors for blocks within the tile set so that the regions referenced by motion-compensated prediction processes fall within the same tile set in the reference picture(s).

The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks, sub-blocks or other sets of pixel values of a current picture of the input video signal (505). The current picture can be entirely or partially coded using intra-picture coding. Using values of a reconstruction (538) of the current picture, the intra-picture estimator (540) determines how to spatially predict pixel values of a current block, sub-block, etc. of the current picture from neighboring, previously reconstructed pixel values of the current picture. The intra-prediction estimator (540) produces as side information intra prediction data (542) such as prediction mode data. The intra prediction data (542) is provided to the header formatter/entropy coder (590) as well as the intra-picture predictor (545). According to prediction mode data, the intra-picture predictor (545) spatially predicts pixel values of a current block or sub-block of the current picture from neighboring, previously reconstructed pixel values of the current picture.

The intra/inter switch selects values of a motion-compensated prediction or intra-picture prediction for use as the prediction (558) for a given block, sub-block or other set of pixel values. The difference (if any) between a sub-block, block, etc. of the prediction (558) and corresponding part of the original current picture of the input video signal (505) is the residual (518) for the sub-block, block, etc. During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial domain video information into frequency domain (i.e., spectral, transform) data. For block-based video coding, the frequency transformer applies a discrete cosine transform, an integer approximation thereof, or another type of forward block transform to blocks or sub-blocks of prediction residual data (or pixel value data if the prediction (558) is null), producing blocks/sub-blocks of frequency transform coefficients. The scaler/quantizer then scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks/sub-blocks of reconstructed prediction residuals or pixel values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). For inter-picture prediction, the values of the reconstruction (538) can be further filtered. A filtering control (560) determines how to perform deblock filtering and sample adaptive offset ("SAO") filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Tile boundaries can be selectively filtered or not filtered at all, depending on settings of the encoder (500). The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For example, the header formatter/entropy coder (590) uses context-adaptive binary arithmetic coding for entropy coding of various syntax elements. The header formatter/entropy coder (590) provides the encoded data in the coded video bitstream (595). The format of the coded video bitstream (595) can be HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
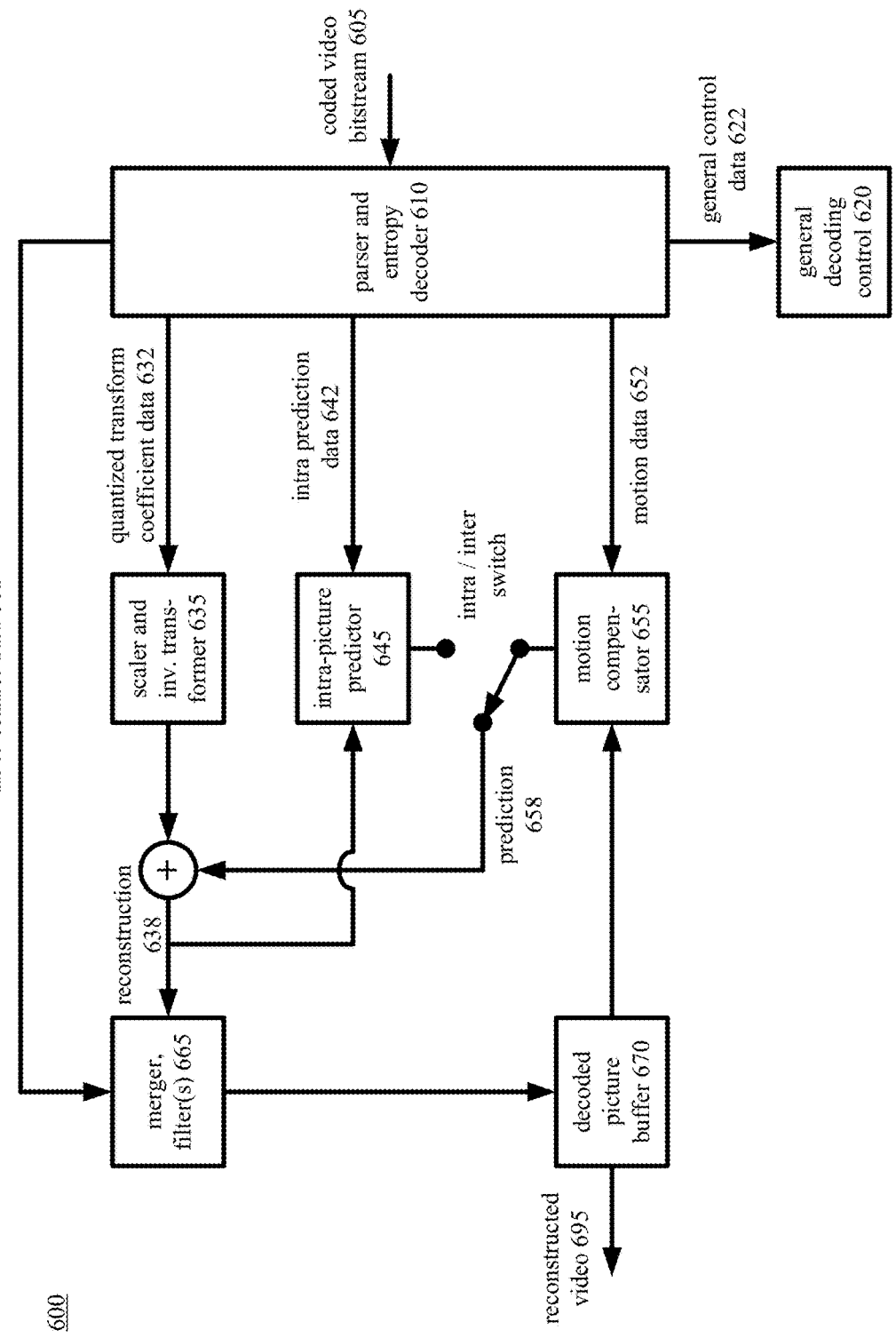
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data in a coded video bitstream (605) and produces output including pictures for reconstructed video (695). The format of the coded video bitstream (605) can be HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. For example, a picture can be divided into 64×64 blocks, 32×32 blocks or 16×16 blocks, which can in turn be divided into smaller blocks and sub-blocks of pixel values for decoding.

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding. Based on MCTS control data, the general decoding control (620) can decide how to take advantage of MCTSs during decoding (e.g., for region-of-interest decoding for selected tile set, for parallel decoding of different tile sets).

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for sub-blocks and/or blocks of the current picture. The decoded picture buffer (670) stores one or more previously reconstructed pictures for use as reference pictures.

In a separate path within the decoder (600), the intra-prediction predictor (645) receives the intra prediction data (642), such as prediction mode data. Using values of a reconstruction (638) of the current picture, according to prediction mode data, the intra-picture predictor (645) spatially predicts pixel values of a current block or sub-block of the current picture from neighboring, previously reconstructed pixel values of the current picture.

The intra/inter switch selects values of a motion-compensated prediction or intra-picture prediction for use as the prediction (658) for a given block, sub-block or other set of pixel values. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks/sub-blocks of reconstructed prediction residuals or pixel values. For example, the inverse frequency transformer applies an inverse block transform to frequency transform coefficients, producing pixel value data or prediction residual data. The inverse frequency transform can be an inverse discrete cosine transform, an integer approximation thereof, or another type of inverse frequency transform.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Tile boundaries can be selectively filtered or not filtered at all, depending on settings of the decoder (600). The decoded picture buffer (570) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Signaling and Use of Control Data for Motion-Constrained Tile Sets

This section presents various innovations for signaling and use of control data for a motion-constrained tile set ("MCTS"). In general, the MCTS control data indicates that inter-picture prediction processes within one or more specified sets of tiles (the MCTS(s)) are constrained to reference only specific regions (e.g., regions within each corresponding set of tiles in other pictures). The innovations can enable a decoder to correctly decode a specified MCTS within the pictures of a coded video sequence without needing to decode the entire content of each picture. By providing an explicit indication of when inter-picture prediction dependencies in coded video are constrained across specific boundaries (e.g., tile set boundaries), MCTS control data can facilitate complexity scalability for region-of-interest decoding and display, enable simple transcoding, provide improved loss robustness, and enable enhanced decoder parallelism.

Various examples are provided for MCTS control data as signaled in supplemental enhancement information ("SEI") messages according to a version of the HEVC standard. Such MCTS control data SEI messages can readily be incorporated into the HEVC format.

A. Example Tiles and Tile Sets

In general, tiles are rectangular regions of a picture. Tiles are arranged within the picture according to tile columns and tile rows. Thus, tiles define horizontal and vertical boundaries within the picture. Tiles within a picture can be uniformly sized, or tiles within a picture can vary in size.

In the January 2013 version of the HEVC standard, for example, a picture can be partitioned into multiple tiles. The tiles_enabled_flag syntax element is signaled in a picture parameter set ("PPS"). When tiles_enabled_flag is 1, a picture is partitioned into tiles, and the number of tile columns, number of tile rows and size information are signaled. The size information can indicate a uniform size for all tiles, or a specific size can be signaled per tile. See Bross et al., "High Efficiency Video Coding (HEVC) Text Specification Draft 8", JCTVC-L1003_v34, January 2013.

In general, a tile is coded independent of other tiles for some encoding processes. According to the January 2013 version of the HEVC standard, when tiles are used, HEVC bitstream syntax and HEVC decoding processes are structured to eliminate (1) intra-picture prediction dependencies across tile boundaries within the same picture, and (2) entropy coding/decoding dependencies across tile boundaries within the same picture. Loop filtering is selectively disabled across tile boundaries, but is allowed in some cases. Inter-picture prediction dependencies are not constrained, however, with respect to tile boundaries. A prediction unit in a tile can reference regions in a reference picture that are outside of the spatial boundaries of a collocated tile in the reference picture. Thus, for tiles in the January 2013 version of the HEVC standard, no independence relationship is required for tiles relative to other tiles within other pictures that are used as references for inter-picture prediction.

A tile set is an arrangement of one or more tiles in a picture. A tile set can be specified as one or more ranges of tiles within the picture. As explained in the next section, a motion-constrained tile set ("MCTS") is a tile set for which inter-picture prediction dependencies are limited to regions within the tile set from picture-to-picture. In simple cases, the pictures in a series have the same configuration of tile sets, so the tile set in a current picture has a collocated tile set in its reference picture(s).

Figure 7A:
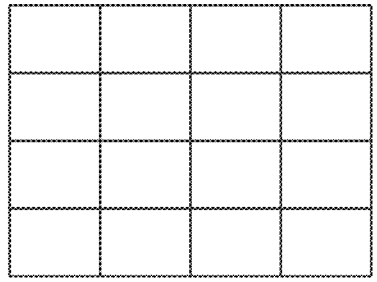

FIG. 7a shows a frame (701) partitioned into 16 uniformly sized tiles. The count of tiles depends on implementation and can have some other value (e.g., 9, 20 or 25 tiles). In FIGS. 7b-7g, the tiles are grouped into tile sets in different ways.

Figure 7B:
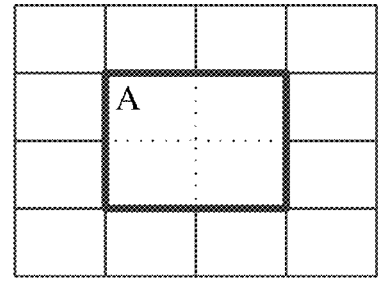

A tile set can include multiple tiles. For example, FIG. 7b shows a frame (702) in which four tiles at the center of the frame (702) are organized as one tile set—tile set A. Alternatively, a tile set can include a single tile. In an extreme case, each tile in a picture can be defined as its own tile set (e.g., 16 tile sets for the 16 tiles, respectively, of the frame in FIG. 7a).

Figure 7C:
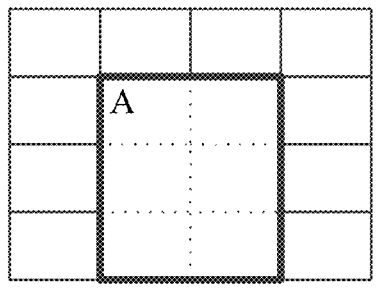

The count of tiles in a tile set, and configuration of tiles within a tile set, can be specified arbitrarily from the available tiles. For example, FIG. 7c shows a frame (703) in which six tiles of the frame (703) are organized as one tile set—tile set A. The remaining tiles are not in any tile set. A given tile of a frame can be allocated to a tile set or left out of tile sets.

Figure 7D:
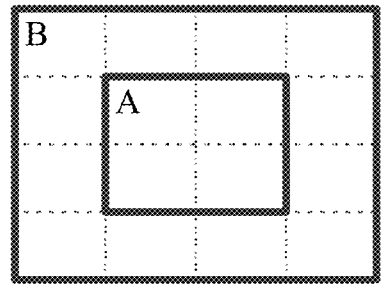

FIG. 7d shows a frame (704) in which all 16 tiles are allocated to tile sets. Tile set A includes four tiles at the center of the frame (704), and tile set B includes the remaining 12 tiles that surround the tiles of tile set A in the frame (704).

Figure 7E:
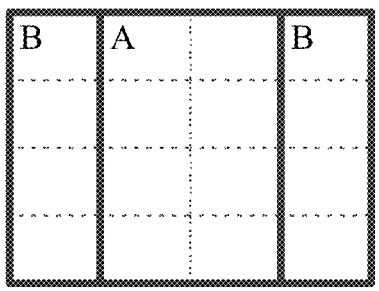

In FIGS. 7b-7d, the tiles of a given tile set are contiguous, but the tiles in a tile set need not be contiguous. For example, FIG. 7e shows a frame (705) in which 8 tiles are allocated to tile set A, and 8 tiles are allocated to tile set B. The 8 tiles of tile set B are separated into two regions on opposite sides of tile set A in the frame (705).

In many cases, a tile set includes one or more tiles at the center of a frame, as in FIGS. 7b-7e. This configuration of tiles can be useful for region-of-interest decoding (e.g., when the intended focal point is at the center or when an identified region contains a talking head for videoconferencing). The configuration shown in FIGS. 7b and 7d offers the further advantage that aspect ratio is unchanged between the center tile set (tile set A) and frame.

Figure 7F:
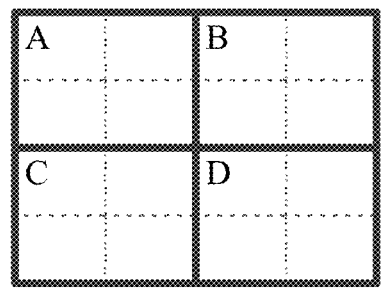

On the other hand, FIG. 7f shows a frame (706) in which tiles are allocated to four tile sets A, B, C and D covering all of the frame (706). Each tile set has four tiles. This configuration of tile sets can facilitate parallel encoding and decoding. In particular, for MCTSs, motion estimation (during encoding) and motion compensation (during encoding or decoding) can be performed in parallel for tiles sets A, B, C and D.

In FIGS. 7b-7f, a tile is part of at most one tile set. In some implementations, however, a tile can be part of multiple tile sets. FIG. 7g shows three different views of a frame (707) in which some of the tiles are part of multiple tile sets, some of the tiles are part of a single tile set, and some of the tiles are part of no tile set. In the frame (707) shown in FIG. 7g, the tiles in the top row of tiles are part of tile set A, tile set B (which overlaps tile set A) and tile set C (which overlaps tile set A and tile set B). The tiles in the second row are part of tile set B and tile set C. The tiles in the third row are part of tile set C, and the tiles in the fourth row are part of no tile set. Such a configuration of tiles can facilitate functionality such as gradual decoder refresh, when the tile set used for encoding and decoding a given picture can change from picture-to-picture within a sequence, or when the size, shape and/or location of referenceable regions for tile sets are allowed to change from picture-to-picture within a sequence.

B. Motion-Constrained Tile Set, Generally

A motion-constrained tile set ("MCTS") is a tile set for which inter-picture prediction dependencies are limited to a specific region or regions. In many cases, the specific regions are within the same tile set from picture-to-picture. In other cases, however, the specific regions are within another tile set or some other region or regions of the reference pictures that are used for inter-picture prediction. In general, it is possible to perform motion compensation for a given MCTS independent of the decoding of other tile sets or regions outside the MCTS. This is possible because inter-picture prediction is constrained to not refer to any regions outside of the MCTS in reference pictures (that is, outside of the collocated tile set in the reference pictures).

Encoding for an MCTS can be implemented through constraints on searching for motion vectors during motion estimation. The search range for a motion vector is limited by tile set boundaries.

FIG. 8 shows motion estimation and motion-compensated prediction for a prediction unit of a tile set without motion constraints at tile set boundaries. The current frame (820) includes a tile set A (822) with a prediction unit (824) that is a block or sub-block of samples. A motion vector (826) for the prediction unit (824) is associated with a region (814) in a reference frame (810) that is used to generate the motion-compensated prediction values for the prediction unit (824). The region (814) lies partially within collocated tile set A (812) in the reference frame (810), and partially outside tile set A (812) in the reference frame (810). Tile set A is not an MCTS, so there is no constraint on inter-picture prediction processes for prediction units in the tile set A referencing locations of samples values outside of tile set A. As a result, correct decoding of the prediction unit (824) of the current frame (820) depends on reconstruction of values outside of tile set A (812) in the reference frame (810).

In contrast, FIG. 9 shows motion estimation and motion-compensated prediction for a prediction unit of a tile set with motion constraints at tile set boundaries. The current frame (920) includes a tile set A (922) with a prediction unit (924) that is a block or sub-block of samples. A motion vector (926) for the prediction unit (924) is associated with a region (914) in a reference frame (910) that is used to generate the motion-compensated prediction values for the prediction unit (924). Even if a region partially or entirely outside of the tile set A (912) might give a better prediction for the prediction unit (924), due to constraints on motion estimation range, the encoder uses a region (914) that lies entirely within collocated tile set A (912) in the reference frame (910). Tile set A is an MCTS, so no inter-picture prediction processes for a prediction unit in the tile set A can reference locations of samples values outside of tile set A. As a result, correct decoding of the prediction unit (924) of the current frame (920) does not depend on reconstruction of values outside of tile set A (912) in the reference frame (910).

Thus, with MCTS, inter-picture prediction dependencies are constrained across tile set boundaries. Motion is still allowed across tile boundaries within a tile set, however. Constraints on intra-picture prediction dependencies and arithmetic coding dependencies for tiles still apply. When filtering operations (e.g., for deblock filtering) are performed across tile boundaries, some of the tile set boundaries may be affected. As a result, the sample values of a reference frame used during encoding may not exactly match the sample values of a reference frame used during decoding. Specifically, if only the MCTS is decoded during decoding, the sample values at the tile set boundaries of the MCTS may be different in the reference frame since loop filtering across such tile set boundaries is not performed. This can have a minor negative effect on quality of MCTS-only decoding compared to full-picture decoding.

Decoding for an MCTS does not involve changes to core decoding processes. A decoder may use MCTS control data, however, to decide how to parallelize decoding for separate tile sets for different parts of pictures, or decide to perform ROI decoding, as explained below.

C. Example Uses of MCTSs and MCTS Control Data

This section describes various uses of MCTSs and MCTS control data, including parallel encoding and decoding, region-of-interest decoding and display, simplified transcoding, and loss recovery. MCTS control data can enable useful functionality for regular video coding/decoding, and it can also be viewed as a scalability extension for complexity scalability.

1. Parallel Encoding and/or Parallel Decoding

An encoder can encode separate MCTSs in parallel for many encoding operations. The encoder segments its encoding processes in a region-specific manner for the regions defined by tile sets. Using MCTS control data, a corresponding decoder can decode the separate MCTSs in parallel for many decoding operations. The decoder segments its decoding processes in a region-specific manner for the regions defined by the tile sets. In particular, for motion compensation for a given tile set, the encoder (or decoder) does not need to access sample values of reference pictures for regions outside of the given tile set. Thus, different MCTSs can be encoded or decoded in parallel, with no need to wait for reconstruction of entire reference pictures.

Figure 10:
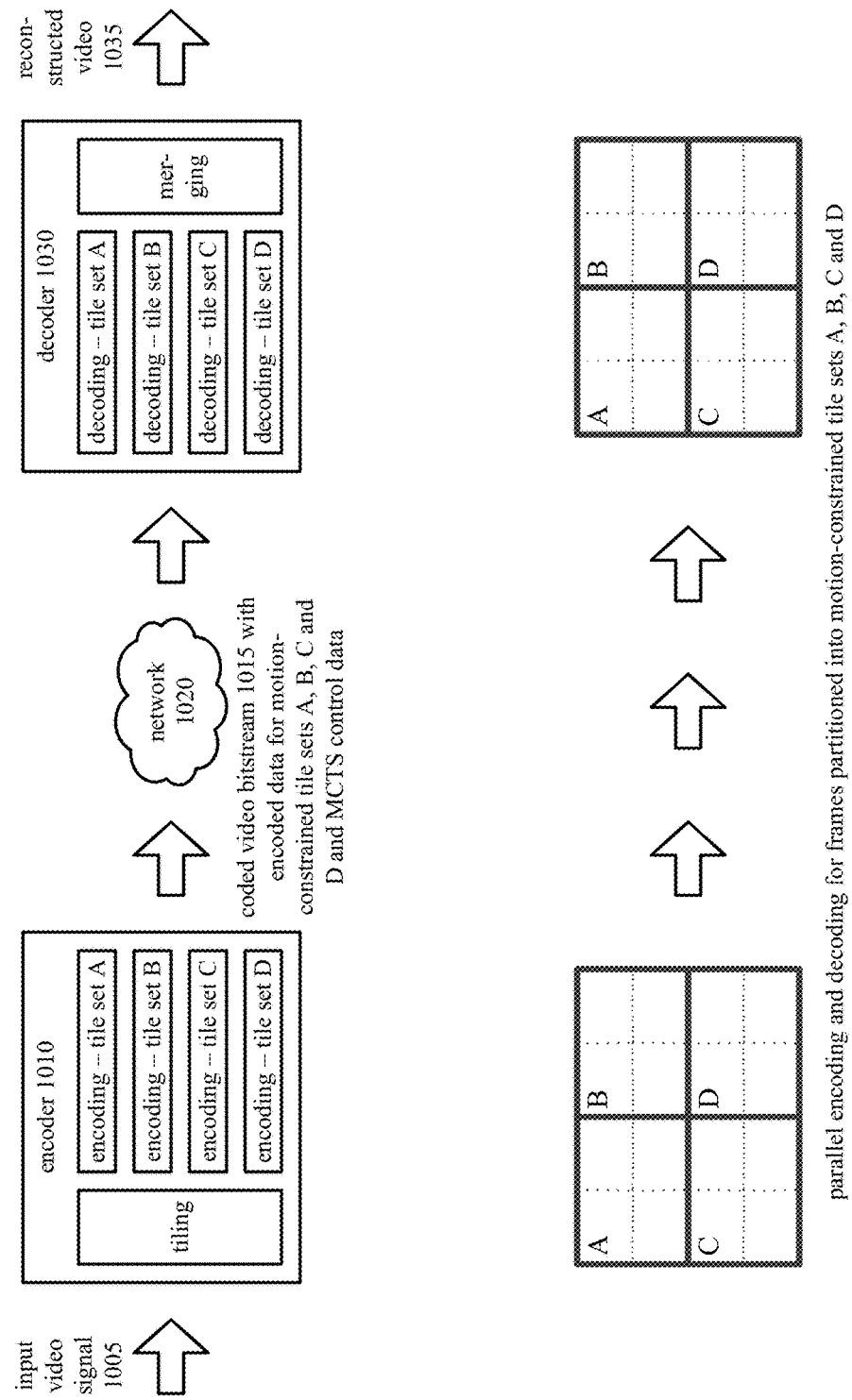
FIG. 10 is a diagram illustrating an example of parallel encoding and parallel decoding for pictures with MCTSs.

FIG. 10 shows an example (1000) of parallel encoding and parallel decoding for pictures with MCTSs. In FIG. 10, the encoder (1010) receives the input video signal (1005), tiles it into four tile sets A, B, C and D (as in FIG. 7*f*), and encodes the respective tile sets in parallel. (Some encoding processes of the encoder (1010), e.g., loop filtering, are not performed in parallel for different tile sets.) The encoder (1010) produces a coded video bitstream (1015) with encoded data for the tile sets A, B, C and D. The coded video bitstream (1015) also includes MCTS control data.

The coded video bitstream (1015) is conveyed over the network (1020) to the decoder (1030). Using the MCTS control data to identify an opportunity for parallel decoding, the decoder (1030) decodes the respective tile sets in parallel, merges the reconstructed content for the tile sets, and produces reconstructed video (1035). (Some decoding processes of the decoder (1030), e.g., loop filtering, are not performed in parallel for different tile sets.)

Although FIG. 10 shows both parallel encoding and parallel decoding, alternatively, only parallel encoding is implemented or only parallel decoding is implemented. Also, although FIG. 10 shows encoding and decoding in which the number of instances of parallel processes matches the number of tile sets (that is, 4), alternatively, the number of instances of parallel processes is less than the number of tile sets.

2. ROI Decoding

When inter-picture prediction over tile set boundaries is constrained, a tile set can be decoded and displayed independently for region-of-interest ("ROI") decoding and display. A decoder can use MCTS control data for ROI decoding and display of one or more selected tile sets. In this case, only the subset of tiles specified by the tile set(s), instead of the entire pictures, is decoded and displayed. For example, the decoder only decodes the subset of a coded video bitstream that contains the encoded data for the selected tile set(s), instead of decoding the encoded data for the complete pictures.

FIG. 11 shows an example (1100) of ROI decoding for pictures with an MCTS. In FIG. 11, the encoder (1110) receives the input video signal (1105), tiles it to include a tile set A (as in FIG. 7*b*), and encodes the video. The encoder (1110) encodes tile set A as an MCTS. The encoder (1110) produces a coded video bitstream (1115) with encoded data for the entire picture, including tile set A as an MCTS. The coded video bitstream (1115) also includes MCTS control data.

The coded video bitstream (1115) is conveyed over the network (1120) to the decoder (1130). Using the MCTS control data to identify an opportunity for ROI decoding, the decoder (1130) decodes the encoded data for tile set A and produces reconstructed video (1135) for tile set A.

ROI decoding is especially helpful when the selected tile set for ROI decoding is a single rectangular area, which can be a single tile or contiguous rectangular area of tiles as in FIG. 7*b* or 7*d*. For example, the single rectangular area can be decoded for display on a small display device. Or, the single rectangular area can be decoded for display as a picture-in-picture display window. Or, the single rectangular area can be decoded for display as a part of a composite with small regions created from other bitstreams (e.g., for a multi-party conference).

Furthermore, in bandwidth-limited scenarios such as real-time communication, signaling and use of MCTSs enable a new dimension of ROI scalability, with different streaming bit rates for different decoding/display resolutions. This could be helpful for scenarios in which video content is delivered to different devices through heterogeneous channels. For example, a bitstream can be organized as MCTSs configured as one or more concentric "ring" regions around a center MCTS, such that (a) the center MCTS provides a lowest bitrate and picture size, (b) the center MCTS plus first concentric ring region provide a higher bitrate and picture size, (c) the center MCTS plus first two concentric ring regions provide a still higher bitrate and picture size, and so on. Or, MCTSs can be organized for combination in other ways.

MCTS control data specifying one or more regions for ROI decoding can be used in conjunction with pan-scan metadata. For example, pan-scan SEI messages allow for specification of rectangles for ROI display. With MCTS SEI messages controlling ROI decoding, pan-scan SEI messages can further enable ROI display.

3. Transcoding

In some cases, a transcoder performs simple low-delay transcoding operations to extract encoded data for one or more selected tile sets from a coded video bitstream for video having a larger picture size, producing a new coded video bitstream for video having a smaller picture size. For example, for HEVC transcoding, when an MCTS is a rectangular area, the transcoder can produce the new coded video bitstream for the MCTS by modifying only high-level syntax elements, without needing to fully decode and re-encode lower level data (such as the data at the coding tree unit level and below).

FIG. 12 shows an example (1200) of transcoding for pictures with an MCTS. In FIG. 12, the encoder (1210) receives the input video signal (1205), tiles it to include a tile set A (as in FIG. 7b), and encodes the video. The encoder (1210) encodes tile set A as an MCTS. The encoder (1210) produces a coded video bitstream (1215) with encoded data for the entire picture, including tile set A as an MCTS. The coded video bitstream (1215) also includes MCTS control data.

The coded video bitstream (1215) is conveyed over the network (1220) to the transcoder (1230). Using the MCTS control data to identify an opportunity for transcoding, the transcoder (1230) discards encoded data for regions of the picture outside of tile set A, and produces a coded video bitstream (1235) with encoded data for only tile set A.

In HEVC implementations, even when the MCTS is not rectangular, or is rectangular but is not transcoded, in some cases, the subset of the bitstream necessary for decoding the MCTS can be extracted prior to sending the data to a decoder that is capable of operating on such an MCTS bitstream subset.

4. Loss Robustness and Recovery

Signaling and use of MCTS control data can also improve robustness to data loss and recovery from data loss. By providing a decoder with an explicit indication of region-by-region dependency relationships within decoded pictures, the decoder may be able to complete decoding of some regions (tile sets) when encoded data for other regions (tile sets) has been corrupted or otherwise lost.

5. Gradual Decoder Refresh

An encoder can implement gradual decoder refresh functionality using MCTS control data in some implementations. For example, when a tile can be part of multiple tile sets (as in the example of FIG. 7g), the top row of tiles can define one MCTS, with the top two rows of tiles defining a second MCTS, the top three rows of tiles defining a third MCTS, and so on. The encoder can use such MCTSs for gradual decoder refresh functionality.

FIG. 13 shows an example (1300) of gradual decoder functionality with MCTSs. For one picture (1301) in a series (picture 30 in FIG. 13), the encoder refreshes the region for MCTS A. The encoder encodes the top row of tiles (which will be encoded as MCTS A in a later frame) using intra-picture coding. The coding of other rows of tiles of picture (1301) is not constrained.

For the next picture (1302) in the series (picture 31 in FIG. 13), the encoder refreshes the region for MCTS B using inter-picture prediction with dependencies on regions in MCTS A and intra-picture coding. The encoder encodes the top row of tiles as an MCTS. This MCTS (as MCTS A) can be encoded using inter-picture prediction relative to the collocated tile set in the previous picture (the top row of tiles in picture 30). The encoder encodes the second row of tiles in the picture (1302) using intra-picture coding. The coding of other rows of tiles of picture (1302) is not constrained.

For the next picture (1303) in the series (picture 32 in FIG. 13), the encoder refreshes the region for MCTS C using inter-picture prediction with dependencies on regions in MCTS B and intra-picture coding. The encoder encodes the top two rows of tiles as an MCTS. This MCTS (MCTS B) can be encoded using inter-picture prediction relative to the collocated tile set in the previous picture (the top two rows of tiles in picture 31). The encoder encodes the third row of tiles in the picture (1303) using intra-picture coding. The coding of the other row of tiles of picture (1303) is not constrained.

For the last picture (1304) in the series (picture 33 in FIG. 13), the encoder refreshes the picture using inter-picture prediction with dependencies on regions in MCTS C and intra-picture coding. The encoder encodes the top three rows of tiles as an MCTS. This MCTS (MCTS C) can be encoded using inter-picture prediction relative to the collocated tile set in the previous picture (the top three rows of tiles in picture 32). The encoder encodes the last row of tiles in the picture (1304) using intra-picture coding. At this point, the rows of tiles in the pictures have been gradually refreshed.

Alternatively, an encoder can implement gradual decoder refresh functionality by allowing the regions shaded in gray in FIG. 13 (intra-picture coded regions) to be coded using either intra-picture coding or inter-picture coding relative to a "subordinate" non-corresponding region in a reference picture that was refreshed. The encoder can decide between intra-picture coding and such inter-picture coding on a block-by-block basis. For example, for the shaded region in the third picture (1303), blocks can be encoded using intra-picture coding or inter-picture coding relative to the region of the second picture (1302) that was just refreshed (top two rows of tiles). This extra flexibility may improve compression performance.

FIG. 13 shows a special case of a more general scenario in which the relationship dynamically changes from picture-to-picture between (a) the region or regions that are referenced in reference pictures and (b) the region or regions of a current picture that depend on them. In such a scenario, the size, shape and/or location of referenceable regions for tile sets are allowed to change from picture-to-picture within a sequence.

One way to implement such dynamic changes is to signal MCTS control data per picture. The MCTS control data for a picture can identify a MCTS that is active for coding and decoding for that picture, where inter-picture prediction dependencies are constrained to fall within a collocated tile set in any reference picture that is used for the identified MCTS. For example, if MCTS B is identified for a current picture, then inter-picture prediction dependencies are constrained to fall within the region of MCTS B in any reference picture (even if MCTS B was not identified for that reference picture).

When MCTS control data can be signaled per picture, one approach is to explicitly specify the tiles in the identified MCTS for that picture. Another approach is to use a common set of MCTSs for all pictures of a coded video sequence (or group of pictures), then identify the active MCTS for a picture using an identifier value within the common set of MCTSs. For example, the common set of MCTSs includes four, five or six (possibly overlapping) MCTSs, and the MCTS control data for a given picture identifies MCTS 2 as the active MCTS for encoding and decoding for that picture.

Another way to implement such dynamic changes is to signal MCTS control data per picture that identifies an active MCTS for the picture and also identifies one or more tile set reference regions of reference pictures. For example, MCTS control data identifies an MCTS for a given current picture and identifies a tile set reference region in a reference picture. For the current picture, different tile set reference regions can be identified in different reference pictures. An identified tile set reference region can be collocated with the identified MCTS for the current picture (as is assumed in many examples described herein), or it can have a different size, shape or location. For the current picture, the tile set reference region(s) can be explicitly signaled (as a rectangle of tiles or as an arbitrary region) or identified by identifier value from a common set of MCTSs that apply for the respective reference pictures. For example, a reference picture can be associated with one or more MCTSs defined when that reference picture was coded, and later pictures (in coding order) can specify tile set reference regions in the reference picture by identifier values of the one or more MCTSs that were previously defined for the reference picture.

D. Example Signaling of MCTS Control Data

This section describes examples of syntax and semantics for MCTS control data.

1. First Example Syntax and Semantics for MCTS SEI Messages

FIG. 14a shows syntax (1401) for an MCTS SEI message in one example implementation. In FIG. 14a, the motion_constrained_tile_set SEI message includes various syntax elements encoded using unsigned integer $0^{th}$-order Exp-Golomb-coding with the left bit first (ue(v)), as well as some syntax elements signaled as flags. The syntax (1401) of the MCTS SEI message is consistent with the HEVC standard, and this section includes references to various syntax elements defined in the HEVC standard.

For the MCTS SEI message shown in FIG. 14a, the scope of the MCTS SEI message is the complete coded video sequence. When an MCTS SEI message is present in any access unit of a coded video sequence, it is present for the first access unit of the coded video sequence in decoding order. The MCTS SEI message may also be present for other access units of the coded video sequence.

The MCTS SEI message is not present for a coded video sequence if the tiles_enabled_flag is 0 for any picture parameter set ("PPS") that is active in the coded video sequence. In this case (tiles_enabled_flag is 0), tiles are not enabled for at least some pictures. Even when tiles are enabled for the pictures of the coded video sequence, the pictures in the coded video sequence should be partitioned into tiles identically. That is, the MCTS SEI message is not present for a coded video sequence unless every PPS that is active for the coded video sequence has the same values for the syntax elements num_tile_columns_minus1, num_tile_rows_minus1, uniform_spacing_flag, column_width_minus1[i], and row_height_minus1[i], which specify how pictures are partitioned into tiles. This constraint is similar to the constraint associated with the tiles_fixed_structure_flag being equal to 1. (If the tiles_fixed_structure_flag, which is signaled in video usability information, is 1, then all of the PPSs active for the coded video sequence have the same number of tile columns, the same number of tile rows and same size information; if 0, then these may vary in different PPSs.)

The MCTS SEI message identifies a tile set, the MCTS. The presence of the MCTS SEI message indicates that inter-picture prediction is constrained such that no sample value outside the identified MCTS, and no sample value at a fractional sample position that is derived using one or more sample values outside the identified MCTS, is used for inter prediction of any sample within the identified MCTS. The syntax elements that identify the MCTS are defined as follows.

The syntax element num_tile_rects_in_set_minus1, with the addition of 1, specifies the number of rectangular regions of tiles (examples of tile rectangles) in the identified MCTS. The value of num_tile_rects_in_set_minus1 is in the range of 0 to (num_tile_columns_minus1+1)*(num_tile_rows_minus1+1)−1, inclusive.

The syntax elements left_tile_column[i] and top_tile_row[i] identify the tile column and tile row, respectively, of the top-left tile in a rectangular region (example of tile rectangle) of the MCTS. The syntax element width_in_tile_columns_minus1[i], with the addition of 1, indicates the width of the rectangular region (example of tile rectangle) of the MCTS in units of tile columns. The value of width_in_tile_columns_minus1[i] is in the range of 0 to num_tile_columns_minus1−left_tile_column[i], inclusive. The syntax element height_in_tile_rows_minus1[i], with the addition of 1, indicates the height of the rectangular region (example of tile rectangle) of the MCTS in units of tile rows. The value of height_in_tile_rows_minus1[i] is in the range of 0 to num_tile_rows_minus1−top_tile_column[i], inclusive.

Thus, the MCTS is the combination of one or more rectangular regions (examples of tile rectangles) of tiles identified in the MCTS SEI message.

In FIG. 14a, the MCTS SEI message includes another syntax element that can be used by a decoder to assess whether quality may be adversely affected in MCTS-only decoding. When the syntax element exact_sample_value_match_flag is equal to 0, within the coded video sequence, when (a) the coding tree blocks that are outside of the MCTS are not decoded and (b) the boundaries of the MCTS are treated as picture boundaries for purposes of the decoding process, the value of each sample in the identified MCTS might not be exactly the same as the value of the same sample when all the coding tree blocks of the picture are decoded. On the other hand, when exact_sample_value_match_flag is equal to 1, within the coded video sequence, when (a) the coding tree blocks that do not belong to the MCTS are not decoded and (b) the boundaries of the MCTS are treated as picture boundaries for purposes of the decoding process, the value of each sample in the MCTS is exactly the same as the value of the sample that would be obtained when all the coding tree blocks of all pictures in the coded video sequence are decoded. Setting exact_sample_value_match_flag equal to 1 may be possible with certain combinations of values for the syntax elements loop_filter_across_tiles_enabled_flag, pps_loop_filter_across_slices_enabled_flag, pps_deblocking_filter_disabled_flag, slice_loop_filter_across_slices_enabled_flag, slice_deblocking_filter_disabled_flag, sample_adaptive_offset_enabled_flag, slice_sao_luma_flag, and slice_sao_chroma_flag.

In FIG. 14a, the MCTS SEI message includes other syntax elements that can be used for ROI display in conjunction with ROI decoding. When pan_scan_rect_flag is 0, the mcts_psr_id element is not present in the MCTS SEI message. When pan_scan_rect_flag is 1, mcts_psr_id is present. The syntax element mcts_psr_id indicates that the identified MCTS covers at least the pan-scan rectangle with pan_scan_rect_id equal to mcts_psr_id within the coded video sequence. When pan_scan_rect_flag is 1, at least one pan-scan rectangle with pan_scan_rect_id equal to mcts_psr_id is present in the coded video sequence.

For the syntax (1401) of MCTS SEI message shown in FIG. 14a, multiple MCTS SEI messages may be associated with the coded video sequence, each identifying an MCTS. Consequently, more than one distinct MCTS may be active within a coded video sequence.

2. Second Example Syntax and Semantics for MCTS SEI Messages

FIG. 14b shows syntax (1402) for an MCTS SEI message in another example implementation. As in FIG. 14a, the motion_constrained_tile_group_set SEI message includes various syntax elements encoded using ue(v) coding, as well as some syntax elements signaled as flags. The syntax (1402) of the MCTS SEI message is consistent with the HEVC standard, and this section includes references to various syntax elements defined in the HEVC standard.

For the MCTS SEI message shown in FIG. 14b to be present, the tiles_enabled_flag is equal to 1 for all active PPSs in the coded video sequence (indicating pictures have tiles), and the tiles_fixed_structure_flag is equal to 1 in the coded video sequence. This indicates all of the PPSs active for the coded video sequence specify the same number of tile columns, the same number of tile rows and same size information for pictures in the coded video sequence.

When present, the MCTS SEI message only appears where it is associated with the first primary picture of a coded video sequence, a broken link access ("BLA") picture or an instantaneous decoding refresh ("IDR") picture. The target picture set for the MCTS SEI message contains all consecutive primary coded pictures in decoding order starting with the associated first primary coded picture (inclusive) and ending with (a) the following primary coded BLA or IDR picture (exclusive) or (b) the very last primary coded picture in the coded video sequence (inclusive) in decoding order when there is no following primary coded BLA or IDR picture.

The MCTS SEI message identifies a tile set, the MCTS, which is a collection of one or more tiles. A group (example of tile rectangle) of one or more tiles for the MCTS is identified by the top_left[i] and bottom_right[i] syntax elements. When separate_colour_plane_flag is 1, the term "primary coded pictures" represents the parts of the corresponding primary coded pictures that correspond to the NAL units having the same colour_plane_id. The MCTS SEI message indicates that, for each picture in the target picture set, inter-picture prediction is constrained as follows. No sample value outside the MCTS, and no sample value at a fractional sample position that is derived using one or more sample values outside the MCTS, is used for inter-picture prediction of any sample within the MCTS.

The MCTS is the combination of one or more rectangular regions of tiles (tile groups, which are examples of tile rectangles) identified in the MCTS SEI message. The element num_tile_groups_in_set_minus1, with the addition of 1, specifies the number of tile groups (examples of tile rectangles) in the MCTS. The allowed range of num_tile_groups_in_set_minus1 is 0 to (num_tile_columns_minus1+1)×(num_tile_rows_minus1+1)−1, inclusive.

The syntax elements top_left[i] and bottom_right[i] specify the top-left corner and bottom-right corner, respectively, of a tile group (example of tile rectangle) with constrained inter-picture prediction, in units of coding tree blocks. The values of top_left[i] and bottom_right[i] are tile group unit positions in a raster scan of the picture. For each rectangle i, the following constraints are obeyed by the values of the top_left[i] and bottom_right[i]:
top_left[i] is less than or equal to bottom_right[i];
bottom_right[i] is less than PicSizeInCtbsY;
(top_left[i] % PicWidthInCtbsY) is less than or equal to the value of (bottom_right[i] % PicWidthInCtbsY); and the rectangle specified by top_left[i] and bottom_right[i] contains one or more complete tiles.

In FIG. 14b, the MCTS SEI message includes other syntax elements that can be used for ROI display in conjunction with ROI decoding. When the syntax element pan_scan_rect_flag is 0, pan_scan_rect_id is not present. When pan_scan_rect_flag is 1, pan_scan_rect_id is present. The syntax element pan_scan_rect_id indicates that the specified MCTS covers at least the pan-scan rectangle identified by pan_scan_rect_id within the target picture set.

For the syntax (1402) of MCTS SEI message shown in FIG. 14b, multiple MCTS SEI messages may be associated with the same target picture set. Consequently, more than one MCTS may be active within a target picture set.

3. Third Example Syntax and Semantics for MCTS SEI Messages

FIG. 14c shows syntax (1403) for an MCTS SEI message in another example implementation. The presence of the MCTS SEI message indicates that the inter prediction process is constrained such that no sample value outside each identified tile set, and no sample value at a fractional sample position that is derived using one or more sample values outside the identified tile set, is used for inter prediction of any sample within the identified tile set. Except as indicated in this section, the syntax (1403) of the MCTS SEI message shown in FIG. 14c is the same as the syntax (1401) of the MCTS SEI message shown in FIG. 14a.

When more than one MCTS SEI message is present within the access units of a coded video sequence, they shall contain identical content. The number of MCTS SEI messages in each access unit shall not exceed 5.

The num_sets_in_message_minus1, with the addition of 1, specifies the number of MCTSs identified in the SEI message. The value of num_sets_in_message_minus1 is in the range of 0 to 255, inclusive.

The mcts_id[i] syntax element contains an identifying number that may be used to identify the purpose of the $i^{th}$ identified tile set. For example, the mcts_id[i] syntax element can be used to identify an area to be extracted from the coded video sequence for a particular purpose. The value of mcts_id[i] shall be in the range of 0 to $2^{32}-2$, inclusive. Values of mcts_id[i] from 0 to 255 and from 512 to $2^{31}-1$ may be used as determined by the application. Values of mcts_id[i] from 256 to 511 and from $2^{31}$ to $2^{32}-2$ are reserved for future use. Decoders encountering a value of mcts_id[i] in the range of 256 to 511 or in the range of $2^{31}$ to $2^{32}-2$ ignore it (remove it from the bitstream and discard it).

The remaining syntax elements num_tile_rects_in_set_minus1[i], left_tile_column[i][j], top_tile_row[i][j], width_in_tile_columns_minus1[i][j], height_in_tile_rows_minus1[i][j], exact_sample_value_match_flag[i], pan_scan_rect_flag[i], and mcts_psr_id[i] generally have the meaning explained with reference to the syntax (1401) of the example MCTS SEI message of FIG. 14a. For each syntax element, however, the loop counter variable i indicates the value of the syntax element for the $i^{th}$ MCTS specified in the MCTS SEI message, and the loop counter variable j indicates the value for the $j^{th}$ tile rectangle in a given MCTS. Alternatively, instead of using left_tile_column[i][j], top_tile_row[i][j], width_in_tile_columns_minus1[i][j], and height_in_tile_rows_minus1[i][j], two syntax elements for a given tile rectangle can identify the tile position of the top-left tile in the tile rectangle and the tile position of the bottom-right tile in the tile rectangle, respectively, in tile raster scan order.

4. Alternative Syntax and Semantics for MCTS Control Data

In the two preceding sections, one MCTS SEI message specifies one MCTS and identifies the tile(s) in that MCTS. For this approach, there can be multiple SEI messages for MCTS control data when there are multiple MCTSs for a single coded video sequence, with each MCTS SEI message specifying a different MCTS within the same coded video sequence.

Alternatively, a single MCTS SEI message can specify multiple MCTSs. For example, an outer loop in the syntax of the MCTS SEI message iterates for the respective MCTSs. For a given MCTS, syntax and semantics can follow the example of one of the two preceding sections to identify regions (tile rectangles) of tiles for the MCTS, an associated pan-scan rectangle, etc.

In the two preceding sections, an MCTS SEI message implies that the identified tile set is an MCTS. Alternatively, an MCTS SEI message can decompose a picture into multiple tile sets, and a flag per tile set in the MCTS SEI message indicates whether the tile set is an MCTS or not an MCTS.

In the two preceding sections, the scope of an MCTS SEI message may be a coded video sequence (as in the example of FIG. 14a) or possibly a group of pictures between one BLA or IDR picture (inclusive) and another BLA or IDR picture (as in the example of FIG. 14b). Alternatively, an MCTS SEI message can be signaled per picture or have some other scope.

In the two preceding sections, the pictures affected by an MCTS SEI message have the same configuration of tile sets, such that the tile sets and tiles do not change from picture-to-picture within a coded video sequence (or group of pictures). Alternatively, the size, shape and/or location of the referenceable regions for an MCTS can change from picture-to-picture within the coded video sequence (or group of pictures).

In the two preceding sections, the MCTS control data is an SEI message. Alternatively, the MCTS control data can be some other form of metadata or a syntax element of an elementary video bitstream that indicates that inter-picture prediction dependencies across tile set boundaries are constrained for a given tile set.

F. Techniques for Signaling and Using MCTS Control Data

FIG. 15 shows a generalized technique (1500) for signaling MCTS control data. A video encoder such as one described above with reference to FIG. 3 or 5 or other tool performs the technique (1500).

The tool encodes (1510) multiple pictures to produce encoded data. Each of the multiple pictures is partitioned into multiple tiles. For example, each of the multiple pictures is partitioned into tile rows and tile columns that define the multiple tiles for the picture, and each of the multiple tiles is a rectangular region. In example implementations, each of the multiple pictures is identically partitioned to produce the multiple tiles within each of the multiple pictures. Alternatively, different pictures can be partitioned into tiles differently.

The tool outputs (1520) the encoded data along with control data that indicates that inter-picture prediction dependencies across specific boundaries (e.g., tile set boundaries) are constrained for a given tile set (the MCTS) of one or more tiles of the multiple tiles. The control data can include one or more syntax elements that identify which of the multiple tiles are in the given MCTS.

In example implementations, a given tile set is parameterized in the control data as one or more tile rectangles including the one or more tiles of the tile set. For example, for a given tile rectangle in the tile set, the control data includes syntax elements that identify two corners of the tile rectangle (such as a top-left corner of the tile rectangle and bottom-right corner of the tile rectangle). The control data can also include an identifier of the tile set, a count parameter that indicates a count of tile rectangles in the tile set and, for each of the tile rectangle in the tile set, syntax elements that indicate location of the tile rectangle (e.g., the position, width and height of the tile rectangle).

More generally, the syntax element(s) can include a count parameter that indicates a count of tile regions in the given MCTS, where each of the tile regions covers one or more tiles of the multiple tiles. The syntax element(s) can also include, for each of the tile regions in the given tile set, one or more location parameters that indicate location of the tile region (e.g., the position, width and height of the tile region).

The control data can include other syntax elements. For example, the control data includes a flag that indicates whether (a) samples reconstructed for the given MCTS if portions of the multiple pictures outside of the given MCTS are not decoded, exactly match (b) samples reconstructed for the given MCTS if the portions of the multiple pictures outside of the given MCTS are decoded. Or, the control data includes an identifier of a pan scan rectangle covered by the given MCTS.

In example implementations, the control data is an SEI message for a single MCTS, indicating inter-picture prediction dependencies across tile set boundaries are constrained for the given MCTS. In this case, the control data can include a different SEI message for each of the given MCTS and one or more other MCTSs. Alternatively, the control data is a single SEI message for multiple MCTSs, including the given MCTS and one or more other MCTSs. Or, the control data can be a flag whose value indicates whether inter-picture prediction dependencies across tile set boundaries are constrained for the given tile set. Or, the control data can take some other form.

In example implementations, the given tile set is identical for each of the multiple pictures. Alternatively, the given tile set differs between at least some of the multiple pictures.

The control data can also indicate inter-picture prediction dependencies across specific boundaries are constrained for each of one or more other tile sets of the multiple tiles. This might be the case, for example, when the encoding (1510) has used parallel processing for at least some stages of encoding for the given MCTS and the one or more other MCTSs.

The tool can repeat the technique (1500) on a unit-by-unit basis (e.g., sequence-by-sequence basis, group-by-group basis). For the sake of simplicity, FIG. 15 does not show how the technique (1500) operates in conjunction with other encoding processes.

Figure 16:
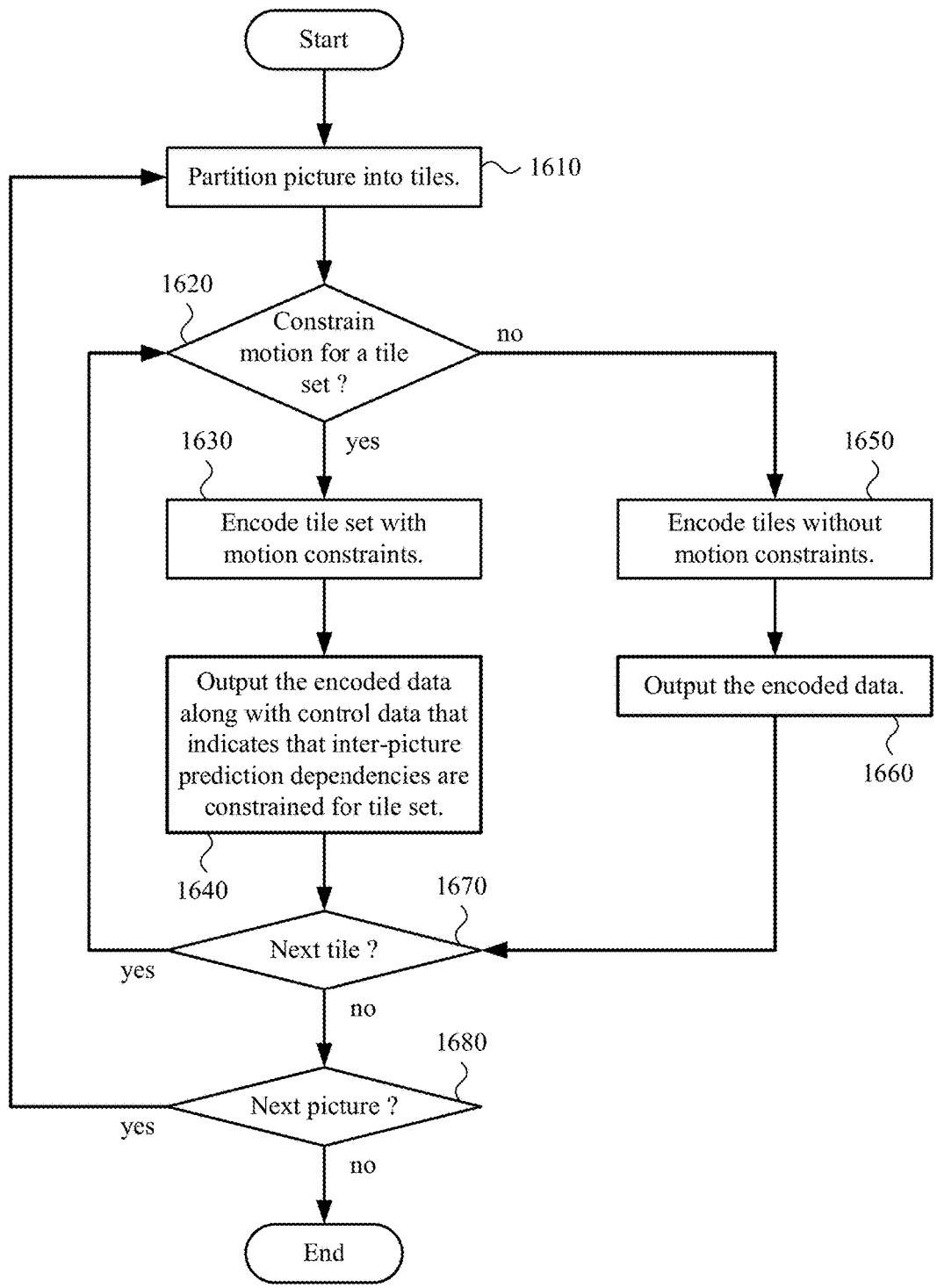
FIG. 16 is a flowchart illustrating an example technique for encoding with selective use of MCTSs.

FIG. 16 shows an example technique (1600) for encoding with selective use of MCTSs. A video encoder such as one described above with reference to FIG. 3 or 5 or other tool performs the technique (1600).

The tool partitions (1610) a current picture into tiles for encoding. The tool decides (1620) whether to constrain motion for a given set of one or more of the tiles. If so, the tool encodes (1630) the tile(s) of the MCTS with motion constraints at tile set boundaries, constraining motion estimation during the encoding such that inter-picture prediction dependencies across tile set boundaries are avoided for the MCTS. The tool outputs (1640) the encoded data along with control data that indicates that inter-picture prediction dependencies across tile set boundaries are constrained for the tile set. Otherwise (motion not constrained for tiles), the tool encodes (1650) the tile(s) without motion constraints at tile set boundaries, and outputs (1660) the encoded data. The tool checks (1670) whether to continue encoding for any other tiles in the picture and, if so, decides (1620) whether or not to encode one or more remaining tiles as an MCTS. After encoding the current picture, the tool decides (1680) whether to continue with the next picture in a series.

FIG. 17 shows a generalized technique (1700) for processing encoded data signaled along with MCTS control data. A video decoder such as one described above with reference to FIG. 4 or 6 or other tool performs the technique (1700).

The tool receives (1710) encoded data for multiple pictures. Each of the multiple pictures is partitioned into multiple tiles. For example, each of the multiple pictures is partitioned into tile rows and tile columns that define the multiple tiles for the picture, and each of the multiple tiles is a rectangular region. In example implementations, each of the multiple pictures is identically partitioned to produce the multiple tiles within each of the multiple pictures. Alternatively, different pictures can be partitioned into tiles differently.

The tool also receives (1720) control data that indicates that inter-picture prediction dependencies across specific boundaries (e.g., tile set boundaries) are constrained for a given tile set (the MCTS) of one or more tiles of the multiple tiles. The control data can include one or more syntax elements that identify which of the multiple tiles are in the given MCTS.

In example implementations, a given tile set is parameterized in the control data as one or more tile rectangles including the one or more tiles of the tile set. For example, for a given tile rectangle in the tile set, the control data includes syntax elements that identify two corners of the tile rectangle (such as a top-left corner of the tile rectangle and bottom-right corner of the tile rectangle). The control data can also include an identifier of the tile set, a count parameter that indicates a count of tile rectangles in the tile set and, for each of the tile rectangles in the tile set, syntax elements that indicate location of the tile rectangle (e.g., the position, width and height of the tile rectangle).

More generally, the syntax element(s) can include a count parameter that indicates a count of tile regions in the given MCTS, where each of the tile regions covers one or more tiles of the multiple tiles. The syntax element(s) can also include, for each of the tile regions in the given tile set, one or more location parameters that indicate location of the tile region (e.g., the position, width and height of the tile region).

The control data can include other syntax elements. For example, the control data includes a flag that indicates whether (a) samples reconstructed for the given MCTS if portions of the multiple pictures outside of the given MCTS are not decoded, exactly match (b) samples reconstructed for the given MCTS if the portions of the multiple pictures outside of the given MCTS are decoded. Or, the control data includes an identifier of a pan scan rectangle covered by the given MCTS.

In example implementations, the control data is an SEI message for a single MCTS, indicating inter-picture prediction dependencies across tile set boundaries are constrained for the given MCTS. In this case, the control data can include a different SEI message for each of the given MCTS and one or more other MCTSs. Alternatively, the control data is a single SEI message for multiple MCTSs, including the given MCTS and one or more other MCTSs. Or, the control data can be a flag whose value indicates whether inter-picture prediction dependencies across tile set boundaries are constrained for the given tile set. Or, the control data can take some other form.

In example implementations, the given tile set is identical for each of the multiple pictures. Alternatively, the given tile set differs between at least some of the multiple pictures.

The tool processes (1730) the encoded data. For example, as part of the processing of the encoded data, the tool decodes the given MCTS as a region-of-interest within the multiple pictures without decoding of portions of the multiple pictures outside of the given MCTS. Or, as part of the processing of the encoded data, the tool transcodes the encoded data by removing encoded data for portions of the multiple pictures outside of the given MCTS, and organizing encoded data for the given MCTS as a new bitstream. The control data can also indicate inter-picture prediction dependencies across specific boundaries are constrained for each of one or more other MCTSs. In this case, the processing of the encoded data can include decoding that uses parallel processing for at least some stages of decoding for the given MCTS and the one or more other MCTSs.

The tool can repeat the technique (1700) on a unit-by-unit basis (e.g., sequence-by-sequence basis, group-by-group basis). For the sake of simplicity, FIG. 17 does not show how the technique (1700) operates in conjunction with other decoding processes.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements an encoder system configured to perform operations comprising:
   encoding multiple pictures to produce encoded data, wherein each of the multiple pictures is partitioned into multiple tiles; and
   outputting the encoded data along with control data that indicates that inter-picture prediction dependencies across specific boundaries are constrained for a given tile set of one or more tiles of the multiple tiles, wherein the given tile set is parameterized in the control data as one or more tile regions covering the one or more tiles of the multiple tiles, and wherein the control data includes:
      a flag that indicates whether or not a first version of sample values is constrained to exactly match a second version of sample values, wherein the first version of sample values is sample values reconstructed for the given tile set if portions outside the given tile set are not decoded, and wherein the second version of sample values is sample values reconstructed for the given tile set if all of the portions outside the given tile set are decoded; and
      for a given tile region of the one or more tile regions in the given tile set, syntax elements that identify two corners of the given tile region.

2. The computer system of claim 1 wherein the one or more tile regions are one or more tile rectangles.

3. The computer system of claim 1 wherein the two corners are a top-left corner of the given tile region and a bottom-right corner of the given tile region.

4. The computer system of claim 1 wherein the control data further includes:
an identifier of the given tile set.

5. The computer system of claim 1 wherein the control data is a supplemental enhancement information ("SEI") message that indicates that inter-picture prediction dependencies across tile set boundaries are constrained for the given tile set.

6. The computer system of claim 1 wherein the operations further comprise:
deciding whether inter-picture prediction dependencies across specific boundaries are to be constrained for the given tile set; and
if so, constraining motion estimation during the encoding such that inter-picture prediction dependencies across specific boundaries are avoided for the given tile set.

7. The computer system of claim 1 wherein the control data further indicates that inter-picture prediction dependencies across specific boundaries are constrained for each of one or more other tile sets of the multiple tiles, and wherein the encoding uses parallel processing for at least some stages of encoding for the given tile set and the one or more other tile sets.

8. The computer system of claim 1 wherein the control data further indicates that inter-picture prediction dependencies across specific boundaries are constrained for each of one or more other tile sets of the multiple tiles, and wherein the encoding configures the given tile set and one or more other tile sets to provide gradual decoder refresh functionality.

9. In a computer system, a method comprising:
receiving encoded data for multiple pictures, wherein each of the multiple pictures is partitioned into multiple tiles;
receiving control data that indicates that inter-picture prediction dependencies across specific boundaries are constrained for a given tile set of one or more tiles of the multiple tiles, wherein the given tile set is parameterized in the control data as one or more tile regions covering the one or more tiles of the multiple tiles, and wherein the control data includes:
a syntax element that can be used to assess whether quality of the given tile set may be adversely affected when decoding the given tile set only; and
for a given tile region of the one or more tile regions in the given tile set, syntax elements that identify two corners of the given tile region; and
processing the encoded data.

10. The method of claim 9 wherein the one or more tile regions are one or more tile rectangles.

11. The method of claim 9 wherein the two corners are a top-left corner of the given tile region and a bottom-right corner of the given tile region.

12. The method of claim 9 wherein the control data further includes:
an identifier of the given tile set.

13. The method of claim 9 wherein the control data is a supplemental enhancement information ("SEI") message that indicates that inter-picture prediction dependencies across tile set boundaries are constrained for the given tile set.

14. The method of claim 9 wherein the processing includes decoding of the given tile set as a region-of-interest within the multiple pictures without decoding of portions of the multiple pictures outside of the given tile set.

15. The method of claim 9 wherein the processing includes transcoding of the encoded data, and wherein the transcoding includes:
removing encoded data for portions of the multiple pictures outside of the given tile set; and
organizing encoded data for the given tile set as a new bitstream.

16. The method of claim 9 wherein the control data further indicates that inter-picture prediction dependencies across specific boundaries are constrained for each of one or more other tile sets of the multiple tiles, and wherein the processing includes decoding that uses parallel processing for at least some stages of decoding for the given tile set and the one or more other tile sets.

17. The method of claim 9 wherein the processing includes:
upon detection of loss of at least some of the encoded data other than the given tile set, decoding of the given tile set as part of loss recovery.

18. The computer system of claim 1 wherein:
when the flag is 0, if the portions outside of the given tile set are not decoded, such that boundaries of the given tile set are treated as picture boundaries for purposes of decoding, the sample values reconstructed for the given tile set might not exactly match the sample values reconstructed for the given tile set if all of the portions are decoded; and
when the flag is 1, if the portions outside of the given tile set are not decoded, such that the boundaries of the given tile set are treated as picture boundaries for purposes of decoding, the sample values reconstructed for the given tile set exactly match the sample values reconstructed for the given tile set if all of the portions are decoded.

19. The method of claim 9 wherein the syntax element is a flag, and wherein:
when the flag is 0, if portions outside of the given tile set are not decoded, such that boundaries of the given tile set are treated as picture boundaries for purposes of decoding, sample values reconstructed for the given tile set might not exactly match sample values reconstructed for the given tile set if all of the portions are decoded; and
when the flag is 1, if the portions outside of the given tile set are not decoded, such that the boundaries of the given tile set are treated as picture boundaries for purposes of decoding, the sample values reconstructed for the given tile set exactly match the sample values reconstructed for the given tile set if all of the portions are decoded.

20. One or more non-volatile memory or storage devices storing computer-executable instructions for causing one or more processing units, when programmed thereby, to perform operations comprising:
receiving encoded data for multiple pictures, wherein each of the multiple pictures is partitioned into multiple tiles;
receiving control data that indicates that inter-picture prediction dependencies across specific boundaries are constrained for a given tile set of one or more tiles of the multiple tiles, wherein the given tile set is parameterized in the control data as one or more tile regions covering the one or more tiles of the multiple tiles, and wherein the control data includes:

a flag that indicates whether or not a first version of sample values is constrained to exactly match a second version of sample values, wherein the first version of sample values is sample values reconstructed for the given tile set if portions outside the given tile set are not decoded, and wherein the second version of sample values is sample values reconstructed for the given tile set if all of the portions outside the given tile set are decoded; and for a given tile region of the one or more tile regions in the given tile set, syntax elements that identify two corners of the given tile region; and processing the encoded data.

\* \* \* \* \*